United States Patent
King

(10) Patent No.: US 12,190,413 B2
(45) Date of Patent: *Jan. 7, 2025

(54) ANISOTROPIC TEXTURE FILTERING FOR SAMPLING POINTS IN SCREEN SPACE

(71) Applicant: Imagination Technologies Limited, Kings Langley (GB)

(72) Inventor: Rostam King, Hertfordshire (GB)

(73) Assignee: Imagination Technologies Limited, Kings Langley (GB)

(*) Notice: Subject to any disclaimer, the term of this patent is extended or adjusted under 35 U.S.C. 154(b) by 0 days.

This patent is subject to a terminal disclaimer.

(21) Appl. No.: 18/228,495

(22) Filed: Jul. 31, 2023

(65) Prior Publication Data

US 2023/0377217 A1 Nov. 23, 2023

Related U.S. Application Data

(63) Continuation of application No. 17/534,749, filed on Nov. 24, 2021, now Pat. No. 11,715,243, which is a (Continued)

(30) Foreign Application Priority Data

Oct. 17, 2019 (GB) .................................. 1915044

(51) Int. Cl.
*G06T 11/00* (2006.01)
*G06T 3/00* (2024.01)
(Continued)

(52) U.S. Cl.
CPC ........ *G06T 11/001* (2013.01); *G06T 2210/36* (2013.01)

(58) Field of Classification Search
CPC ....... G06T 15/04; G06T 15/005; G06T 15/08; G06T 7/44; G06T 11/001; G06T 11/40;
(Continued)

(56) References Cited

U.S. PATENT DOCUMENTS 6,005,582 A 12/1999 Gabriel et al.
6,292,193 B1 9/2001 Perry et al.
(Continued)

FOREIGN PATENT DOCUMENTS

CN 1806259 A 7/2006
CN 102034262 A 4/2011
(Continued)

OTHER PUBLICATIONS

Chen et al., "Footprint Area Sampled Texturing," IEEE Transactions on Visualization and Computer Graphics, vol. 10, No. 2; Mar. 2004; pp. 230-240.

(Continued)

*Primary Examiner* — Wesner Sajous
(74) *Attorney, Agent, or Firm* — Potomac Law Group, PLLC; Vincent M DeLuca

(57) ABSTRACT

Texture filtering in computer graphics calculates first and second pairs of texture-space basis vectors that correspond to first and second pairs of screen-space basis vectors transformed to texture space under a local approximation of a mapping between screen space and texture space. Based on differences in magnitudes of the vectors of the pairs of texture-space basis vectors, an angular displacement is determined between a selected pair of the first and second pairs of screen-space basis vectors and screen-space principal axes of the local approximation of the mapping that indicate maximum and minimum scale factors of the mapping. The determined angular displacement and the selected pair of screen-space basis vectors are used to generate texture-space principal axes, with a major axis associated with the maximum scale factor of the mapping and a minor axis associated with the minimum scale factor of the mapping. A texture is filtered using the major and minor axes.

20 Claims, 10 Drawing Sheets

Related U.S. Application Data continuation of application No. 17/073,522, filed on Oct. 19, 2020, now Pat. No. 11,216,990.

(51) Int. Cl.
   *G06T 5/00* (2024.01)
   *G06T 15/04* (2011.01)

(58) Field of Classification Search
   CPC ............. G06T 2210/04; G06T 2210/36; G06T 2207/20024; G06T 1/20; G09G 2340/0407; G09G 5/003; H04N 5/3572; H04N 5/367; H04N 7/30; H04N 7/35; H04N 7/41; H04N 7/44
   See application file for complete search history.

(56) References Cited

U.S. PATENT DOCUMENTS

| | | | |
|---|---|---|---|
| 7,271,810 B1 | 9/2007 | Newhall, Jr. et al. | |
| 7,339,594 B1 | 3/2008 | Newhall, Jr. et al. | |
| 7,355,604 B2 | 4/2008 | Bando et al. | |
| 7,369,136 B1 | 5/2008 | Heckbert et al. | |
| 10,592,242 B2 * | 3/2020 | Li | B03C 1/01 |
| 11,216,990 B2 * | 1/2022 | King | G06T 15/04 |
| 11,715,243 B2 * | 8/2023 | King | G06T 15/04 |
| | | | 345/587 |
| 2002/0126133 A1 | 9/2002 | Ewins | |
| 2003/0206175 A1 | 11/2003 | Kim et al. | |
| 2003/0234791 A1 | 12/2003 | Boyd et al. | |
| 2005/0024378 A1 | 2/2005 | Pearce et al. | |
| 2006/0250409 A1 | 11/2006 | Bando et al. | |
| 2008/0303841 A1 | 12/2008 | Newhall, Jr. | |
| 2014/0139527 A1 | 5/2014 | McKellar | |
| 2015/0187090 A1 | 7/2015 | Chatterjee et al. | |
| 2017/0206700 A1 | 7/2017 | Munkberg et al. | |
| 2019/0236381 A1 | 8/2019 | Akenine-Moller et al. | |
| 2019/0236831 A1 | 8/2019 | Akenine-Moller et al. | |
| 2022/0237852 A1 | 7/2022 | Akenine-Moller et al. | |

FOREIGN PATENT DOCUMENTS

| | | |
|---|---|---|
| CN | 102087751 A | 6/2011 |
| CN | 103810732 A | 5/2014 |

OTHER PUBLICATIONS (Note: NPL in parent application).

* cited by examiner

ANISOTROPIC TEXTURE FILTERING FOR SAMPLING POINTS IN SCREEN SPACE

CROSS-REFERENCE TO RELATED APPLICATIONS AND CLAIM OF PRIORITY

This application is a continuation under 35 U.S.C. 120 of application Ser. No. 17/534,749 filed Nov. 24, 2021, now U.S. Pat. No. 11,715,243, which is a continuation of prior application Ser. No. 17/073,522 filed Oct. 19, 2020, now U.S. Pat. No. 11,216,990, which claims foreign priority under 35 U.S.C. 119 from United Kingdom Application No. 1915044.0 filed Oct. 17, 2019, the contents of which are incorporated by reference herein in their entirety.

FIELD

The present disclosure relates to techniques for performing texture filtering within computer graphics systems.

BACKGROUND

In computer graphics, texturing is frequently used to add surface detail to objects within the scene to be rendered. Textures are typically stored as images, which are accessed to return a colour value for a pixel being processed. To obtain a texture colour value for a pixel, the values of multiple texels of the texture might be determined. This might be referred to as resampling the texture, or sampling the texture. The sampled texel values might then be filtered to obtain a final texel value for the pixel.

Resampling is performed because typically a single pixel of an image being rendered does not map exactly to a single texel of the texture due to the projection of the texture onto 3D geometry within the image. As described in more detail below, for textured pixels depicting a relatively close view of the texture, each pixel may be associated with a footprint which maps onto a relatively small region of a texture, e.g. covering zero or one texel, whereas for textured pixels depicting a relatively far view of the texture, each pixel may be associated with a footprint which maps onto a relatively large region of a texture, e.g. covering many (e.g. two or more) texels.

One approach to perform texture resampling is through MIP maps. A texture stored as a MIP (multum in parvo, or "much in little") map comprises a sequence of images, each of which is a progressively lower resolution representation of a base texture. MIP maps are used to increase the speed of rendering by performing some of the resampling of the texture off-line. A schematic illustration of a MIP map 100 is shown in FIG. 1. Each successive image in the sequence of images 102-108 is half the width and height (i.e. half the resolution) of the preceding image in the sequence. Each of these images 102-108 may be referred to as a 'MIP map level', or 'level of detail' (LOD) and each is a representation of the same base texture, but at a different resolution. Although the MIP map levels shown in FIG. 1 are square, this need not be the case in general, nor does it need to be two dimensional, though this is generally the case.

To render an image using a MIP map, trilinear filtering may be used. Trilinear filtering comprises a combination of two bilinear filtering operations followed by a linear interpolation (or blend). To render an image at a particular resolution (or level of detail), bilinear filtering is used to reconstruct a continuous image from each of the two closest MIP map levels (i.e. the one at a higher resolution than the required resolution and the one at a lower resolution than the required resolution) and then linear interpolation (or blending) is used to produce an image at the intermediate, and required, resolution.

For example, referring back to FIG. 1, to sample the MIP map at a spatial position (x,y) and at a resolution (res) which is higher than the resolution ($res_{104}$) of image 104 but lower than the resolution ($res_{106}$) of image 106, filtering (e.g. bilinear interpolation) is used to reconstruct a respective texture value at the spatial position (x,y) from each of the two images (or MIP map levels) 104 and 106 and then a resultant texture value at the desired resolution (res) is generated by linearly interpolating between the two reconstructed texture values.

Though trilinear filtering of MIP-mapped textures can help reduce visual artefacts in a rendered image, it can still suffer from the drawback of under sampling the texture for surfaces angled obliquely away from the viewer, i.e. away from the plane of the image. This under sampling typically manifests itself as blurriness in the image as implementations conservatively select lower resolution reconstructions to avoid more objectionable aliasing artefacts (such as high frequency shimmering).

To address this problem, anisotropic texture filtering may be performed. Anisotropic texture filtering recognises that the sampling rate of the texture, which depends on the mapping from screen-space (in which the image is depicted and the pixel coordinates defined) to texture space (in which the texture is depicted and the texel coordinates defined), is a function of the direction of travel in screen space. In other words, the optimal texture sampling rate may be different along different directions of travel, or axes, in screen space. When this is the case, the mapping between screen space and texture space may be said to be anisotropic. An example of an anisotropic mapping is the 3D projection of planar texture surfaces near the horizon, or any other situation in which a texture is applied to a surface in the scene which is significantly angled away from the viewpoint.

For anisotropic texture mappings, a sampling kernel in texture space mapped to a pixel in screen space is elongated along a certain axis in texture space, with the direction of this axis being dependent on the mapping between screen space and texture space. This is illustrated schematically in FIG. 2.

FIG. 2 shows an image 200 formed of pixels having coordinates defined in image space, and a texture 202 formed of texels having coordinates defined in texel space. Image 200 includes an object 204 having surface detail specified by the texture 202, i.e. the texture 202 is mapped to the surface of the object 204. Remaining objects within the image 200 have been omitted for the purposes of clarity. Object 204 is at an oblique viewing angle within the image 200. Consequently, the shape of the footprint of a texture-mapped pixel within the image 200 is not maintained in the mapping to texture space. Numeral 206 denotes the pixel footprint in image space, which is circular, and numeral 208 denotes the corresponding pixel footprint in texel space. It can be seen that the footprint has been elongated in texture space to form an ellipse such that it is anisotropic. In general, the mapping of a pixel with a circular footprint in image space to texture space can be approximated by an ellipse, insofar as the texture mapping itself can be approximated by an affine mapping at the pixel's origin. Here, it is noted that the term 'footprint' as used with respect to pixels does not necessarily refer to the physical shape of the pixel in a display device, but may refer to the area of a pixel filter used to construct the final pixel value for that pixel. The pixel's footprint in texture space may therefore be said to be equivalent to the sampling kernel in texture space for the pixel; i.e. the footprint in texture space identifies the texels to be sampled and filtered to form the texture colour value for the pixel.

Though the approximation of the texture mapping with an elliptical footprint has been illustrated above in the context of a projection, this approximation may remain valid for texture mappings that do not correspond to typical projections, such as those which may be constructed within modern programmable shader architectures that enable arbitrary mappings to be defined.

It can be appreciated that the quality of the texture filtering will depend on the sampling kernel used to perform the filtering. In the case of anisotropic filtering, the quality of the filtering will depend on the size and orientation of the sampling kernel in texture space; for example, if the orientation of the sampling kernel used does not closely align with the direction of anisotropy of the texture mapping, the texture may consequently be over sampled in one direction and under sampled in another direction.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

There is provided a method of performing anisotropic texture filtering for applying a texture at a sampling point in screen space, the method comprising:
calculating texture-filter parameters for use in configuring a filter to perform filtering of the texture for the sampling point; and
filtering the texture for the sampling point using a filtering kernel having a footprint in texture space determined by the texture-filter parameters, wherein the step of calculating the texture-filter parameters comprises:
generating a first and a second pair of screen-space basis vectors, the first and second pairs of screen-space basis vectors being rotated relative to each other;
calculating first and second pairs of texture-space basis vectors that correspond to the first and second pairs of screen-space basis vectors transformed to texture space under a local approximation of a mapping between screen space and texture space;
based on differences in magnitudes of the vectors for at least one of the pairs of texture-space basis vectors, determining an angular displacement between a selected pair of the first and second pairs of screen-space basis vectors and screen-space principal axes of the local approximation of the mapping that indicate the maximum and minimum scale factors of the mapping;
using the determined angular displacement and the selected pair of screen-space basis vectors to generate texture-space principal axes, the texture-space principal axes comprising a major axis associated with the maximum scale factor of the mapping and a minor axis associated with the minimum scale factor of the mapping; and
calculating the texture-filter parameters using the major and minor axes.

The step of using the determined angular displacement and the selected pair of screen-space basis vectors to generate the texture-space principal axes may comprise rotating the selected pair of screen-space basis vectors by the determined angular displacement to generate screen-space principal axes, and transforming the screen-space principal axes to texture space to generate the texture-space principal axes.

The second pair of screen-space basis vectors may be rotated 45 degrees relative to the first pair of screen-space basis vectors.

The pair of screen-space basis vectors having the smaller angular displacement to the screen-space principal axes may be chosen as the selected pair of screen-space basis vectors.

The pair of screen-space basis vectors corresponding to the pair of texture-space basis vectors having the greatest difference in length between vectors of that texture-space pair may be chosen as the selected pair of screen-space basis vectors.

The determining an angular displacement may comprise:
comparing the differences in magnitude of the texture-space basis vectors to determine the angular displacement between each pair of screen-space basis vectors and the screen-space principal axes; and
choosing as the selected pair the screen-space basis vectors having the smaller angular displacement to the screen-space principal axes.

The angular displacement between the first pair of screen-space basis vectors $x_1$, $y_1$ and the screen-space principal axes may be determined according to the equation $$\tan(2\theta_1) = \frac{X_2.X_2 - Y_2.Y_2}{X_1.X_1 - Y_1.Y_1},$$

and the angular displacement between the second pair of screen-space basis vectors $x_2$, $y_2$ and the screen-space principal axes may be determined according to the equation $$\tan(2\theta_2) = \frac{Y_1.Y_1 - X_1.X_1}{X_2.X_2 - Y_2.Y_2},$$

where $\theta_1$ is the angular displacement between the first pair of screen-space basis vectors and the screen-space principal axes, $\theta_2$ is the angular displacement between the second pair of screen-space basis vectors and the screen-space principal axes, $X_1$ and $Y_1$ are the corresponding pair of texture-space vectors for screen-space basis vectors $x_1$ and $y_1$, and $X_2$ and $Y_2$ are the corresponding pair of texture-space vectors for screen-space basis vectors $x_2$ and $y_2$.

The determining an angular displacement may comprise:
for each pair of texture-space basis vectors, calculating the difference in magnitude between the vectors of that pair;
choosing as the selected pair the screen-space basis vectors corresponding to the pair of texture-space basis vectors having the greatest difference in magnitude between the vectors of that pair; and
determining the angular displacement only between the selected pair of screen-space basis vectors and the screen-space principal axes.

The comparing step may comprise:
identifying the texture-space basis vector pair for which either basis vector in that pair is either greater in length or shorter in length than both basis vectors of the other texture-space basis vector pair; and
choosing as the selected pair the screen-space basis vectors corresponding to that identified texture-space basis vector pair.

The angular displacement may be determined according to the equation $$\tan(2\theta) = \frac{X_2 \cdot X_2 - Y_2 \cdot Y_2}{X_1 \cdot X_1 - Y_1 \cdot Y_1}$$

when the first pair of screen-space basis vectors $x_1$, $y_1$ is the selected pair of screen-space basis vectors, and according to the equation $$\tan(2\theta) = \frac{Y_1 \cdot Y_1 - X_1 \cdot X_1}{X_2 \cdot X_2 - Y_2 \cdot Y_2}$$

when the second pair of screen-space basis vectors $x_2$, $y_2$ is the selected pair of screen-space basis vectors, where $\theta$ is the angular displacement between the selected pair of screen-space basis vectors and the screen-space principal axes, $X_1$ and $Y_1$ are the corresponding pair of texture-space basis vector for screen-space basis vector $x_1$ and $y_1$, and $X_2$ and $Y_2$ are the corresponding pair of texture-space basis vector for screen-space basis vector $x_2$ and $y_2$.

The first pair of texture-space basis vectors may be generated from finite differencing of texture coordinates for a 2×2 block of sampling points in screen space, each basis vector of the first pair of texture-space basis vectors being calculated from the difference in texture coordinates for diagonal sampling points of the 2×2 block.

The second pair of screen-space basis vectors may be generated from finite differencing of the first pair of texture-space basis vectors along the horizontal and vertical directions of the 2×2 block of sampling points in screen space.

The step of using the determined angular displacement and the selected pair of screen-space basis vectors to generate the texture-space principal axes may comprise:
 determining the direction of rotation to rotate the selected pair of screen-space basis vectors onto the screen-space principal axes;
 calculating:

$$\rho_{minor} = \begin{cases} \cos\theta\rho_{min} + \sin\theta\rho_{max} & \text{if clockwise rotation} \\ \cos\theta\rho_{min} - \sin\theta\rho_{max} & \text{if anticlockwise rotation} \end{cases}$$

$$\rho_{major} = \begin{cases} \cos\theta\rho_{max} - \sin\theta\rho_{min} & \text{if clockwise rotation} \\ \cos\theta\rho_{max} + \sin\theta\rho_{min} & \text{if anticlockwise rotation} \end{cases}$$

where $\rho_{minor}$ minor is the texture-space minor axis, $\rho_{major}$ is the texture-space major axis, $\theta$ is the angular displacement between the selected screen-space basis vectors and screen-space principal axes, $\rho_{min}$, $\rho_{max} \in X_1$, $X_1$ if the selected basis is $x_1$, $y_1$ where $\rho_{min}=X_1$, $\rho_{max}=Y_1$ if $|X_1|^2 < |Y_1|^2$ and $\rho_{min}=Y_1$, $\rho_{max}=X_1$ if $|X_1|^2 \geq |Y_1|^2$; and $\rho_{min}$, $\rho_{max} \in X_2$, $Y_2$ if the selected basis is $x_2$, $y_2$ where $\rho_{min}=X_2$, $\rho_{max}=Y_2$ if $|X_2|^2 < |Y_2|^2$ and $\rho_{min}=Y_2$, $\rho_{max}=X_2$ if $|X_2|^2 \geq |Y_2|^2$.

The step of calculating the texture-filter parameters may comprise:
 calculating a level of detail (LOD) parameter $\lambda$ indicating MIP-map levels of the texture to filter for the sampling point; and
 calculating an anisotropic LOD parameter $\mu$ indicating the footprint of the filter kernel in the MIP-map levels indicated by the LOD parameter $\lambda$.

The LOD parameter $\lambda$ may be calculated using the major axis and the minor axis.

The anisotropic LOD parameter $\mu$ may be calculated using the major axis.

The step of calculating the LOD parameter $\lambda$ may comprise applying a clamping to an intermediate LOD parameter, and the step of calculating the anisotropic LOD parameter $\mu$ may comprise applying the same clamping to an intermediate anisotropic LOD parameter.

The LOD parameter $\lambda$ and intermediate anisotropic LOD parameter $\mu$ may be calculated by performing the same set of calculations on respective intermediate parameters, the intermediate parameter for the parameter $\lambda$ being calculated using the major axis and the minor axis and the intermediate parameter for the anisotropic parameter $\mu$ being calculated using the major axis.

There is provided a method of performing texture filtering for a sampling point in screen space, comprising:
 determining whether at least one of a set of anisotropic bypass conditions indicating isotropic filtering is to be performed is satisfied; and
 only if none of the set of one or more anisotropic bypass conditions are satisfied, performing the method of anisotropic texture filtering of any preceding claim for the sampling point.

The method may further comprise performing a method of isotropic texture filtering if at least one of the set of anisotropic bypass conditions are satisfied.

The set of anisotropic bypass conditions may comprise one or more of: (i) anisotropic filtering being disabled; (ii) the degree of anisotropy of the mapping between screen space and texture space being less than a specified first threshold; (iii) the degree of isotropy of the mapping between screen space and texture space being above a specified second threshold; (iv) the squared length of the major texture space principal axis relative to the sum of the squared lengths of the major and minor texture space principal axes lies between specified upper and lower bounds; (v) the magnitude of the determined angular displacement is less than a specified third threshold; (vi) the difference between the magnitudes of the minor and major texture space axes being less than a specified fourth threshold.

The degree of anisotropy may be determined from a comparison of the vector lengths of the vectors forming a pair of screen-space basis vectors.

The method of isotropic texture filtering may comprise:
 generating a pair of screen-space basis vectors;
 selecting texture-space basis vectors corresponding to the generated pair of screen-space basis vectors and setting the selected texture-space vectors as the principal axes;
 calculating texture filter parameters from the principal axes; and
 filtering the texture for the sampling point using a filtering kernel having a footprint in texture space determined by the texture filter parameters.

The step of calculating the texture-filter parameters as part of the isotropic texture filtering may comprise:
 calculating a level of detail (LOD) parameter $\lambda$ indicating MIP-map levels of the texture to filter for the sampling point.

The LOD parameter $\lambda$ may be calculated using the major axis and the minor axis, and the step of calculating the LOD parameter $\lambda$ comprises applying a clamping to an intermediate LOD parameter.

There is provided an apparatus configured to perform texture filtering for applying a texture at a sampling point in screen space, comprising:

a basis-calculation unit configured to:
  generate a first and a second pair of screen-space basis vectors, the first and second pairs of screen-space basis vectors being rotated relative to each other;
  calculate first and second pairs of texture-space basis vectors that correspond to the first and second pairs of screen-space basis vectors transformed to texture space under a local approximation of a mapping between screen space and texture space; and
  determine, based on differences in magnitudes of the vectors for at least one of the pairs of texture-space basis vectors, an angular displacement between a selected pair of the first and second pairs of screen-space basis vectors and screen-space principal axes of the local approximation of the mapping that indicate the maximum and minimum scale factors of the mapping;
a principal-axes calculation unit configured to:
  use the determined angular displacement and the selected pair of screen-space basis vectors to generate texture-space principal axes, the texture-space principal axes comprising a major axis associated with the maximum scale factor of the mapping and a minor axis associated with the minimum scale factor of the mapping;
a filter parameter unit configured to calculate texture-filter parameters using the major and minor axes; and
a texture filter unit configured to perform anisotropic texture filtering for the sampling point using a filtering kernel having a footprint in texture space determined by the calculated texture-filter parameters.

There is provided an apparatus configured to perform texture filtering for applying a texture at a sampling point in screen space, comprising:
  a basis-calculation unit;
  a principal-axes calculation unit;
  a filter parameter unit; and
  a texture filter unit;
wherein the basis-calculation unit comprises a bypass detection module configured to determine whether at least one of a set of one or more anisotropic bypass conditions are satisfied; the apparatus being configured to, if none of the set of anisotropic bypass conditions are satisfied, perform a method of anisotropic filtering comprising:
  at the basis calculation unit:
    generating a first and a second pair of screen-space basis vectors, the first and second pairs of screen-space basis vectors being rotated relative to each other; calculating first and second pairs of texture-space basis vectors that correspond to the first and second pairs of screen-space basis vectors transformed to texture space under a local approximation of a mapping between screen space and texture space; and
    determining, based on differences in magnitudes of the vectors for at least one of the pairs of texture-space basis vectors, an angular displacement between a selected pair of the first and second pairs of screen-space basis vectors and screen-space principal axes of the local approximation of the mapping that indicate the maximum and minimum scale factors of the mapping;
  at the principal-axes calculation unit:
    using the determined angular displacement and the selected pair of screen-space basis vectors to generate texture-space principal axes, the texture-space principal axes comprising a major axis associated with the maximum scale factor of the mapping and a minor axis associated with the minimum scale factor of the mapping; at the filter parameter unit:
    calculating texture-filter parameters using the major and minor axes; and
  at the texture filter unit:
    performing anisotropic texture filtering for the sampling point using a filtering kernel having a footprint in texture space determined by the calculated texture-filter parameters;
  the apparatus being further configured to, if at least one of the set of anisotropic bypass conditions are satisfied, perform a method of isotropic filtering comprising:
  at the basis calculation unit:
    generating a pair of screen-space basis vectors;
    selecting texture-space basis vectors corresponding to the generated pair of screen-space basis vectors and setting the selected texture-space vectors as the principal axes;
  at the filter parameter unit:
    calculating texture filter parameters from the principal axes; and at the texture filter unit:
    filtering the texture for the sampling point using a filtering kernel having a footprint in texture space determined by the texture filter parameters.

The set of one or more anisotropic bypass conditions may comprise one or more of: (i) anisotropic filtering being disabled; (ii) the degree of anisotropy of the mapping between screen space and texture space being less than a specified first threshold; (iii) the degree of isotropy of the mapping between screen space and texture space being above a specified second threshold; (iv) the squared length of the major texture space principal axis relative to the sum of the squared lengths of the major and minor texture space principal axes lies between specified upper and lower bounds; (v) the magnitude of the determined angular displacement is less than a specified third threshold; (vi) the difference between the magnitudes of the minor and major texture space axes being less than a specified fourth threshold.

The bypass detection module may be configured to determine whether the first bypass condition is satisfied from a comparison of the lengths of the vectors forming a pair of screen-space basis vectors.

The filter parameter unit may be configured to, if none of the set of anisotropic bypass conditions are satisfied:
  calculate (i) a level of detail (LOD) parameter $\lambda$ indicating MIP-map levels of the texture to filter for the sampling point and (ii) an anisotropic LOD parameter $\mu$ indicating the footprint of the filter kernel in the MIP-map levels indicated by the LOD parameter $\lambda$ by performing the same set of calculations on respective intermediate parameters;
the filter parameter unit being further configured to, if at least one of the set of anisotropic bypass conditions are satisfied:
  calculate a level of detail (LOD) parameter $\lambda$ indicating MIP-map levels of the texture to filter for the sampling point by performing the same set of calculations on an intermediate parameter.

The apparatus may be embodied in hardware on an integrated circuit. There may be provided a method of manufacturing, at an integrated circuit manufacturing system, the apparatus.

There may be provided an integrated circuit definition dataset that, when processed in an integrated circuit manufacturing system, configures the system to manufacture the apparatus. There may be provided a non-transitory computer readable storage medium having stored thereon a computer readable description of an integrated circuit that, when processed in an integrated circuit manufacturing system, causes the integrated circuit manufacturing system to manufacture the apparatus.

There may be provided an integrated circuit manufacturing system comprising:
- a non-transitory computer readable storage medium having stored thereon a computer readable integrated circuit description that describes the apparatus;
- a layout processing system configured to process the integrated circuit description so as to generate a circuit layout description of an integrated circuit embodying the apparatus; and
- an integrated circuit generation system configured to manufacture the apparatus according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

BRIEF DESCRIPTION OF THE DRAWINGS

The present invention is described by way of example with reference to the accompanying drawings. In the drawings.

DETAILED DESCRIPTION

Figure 1:
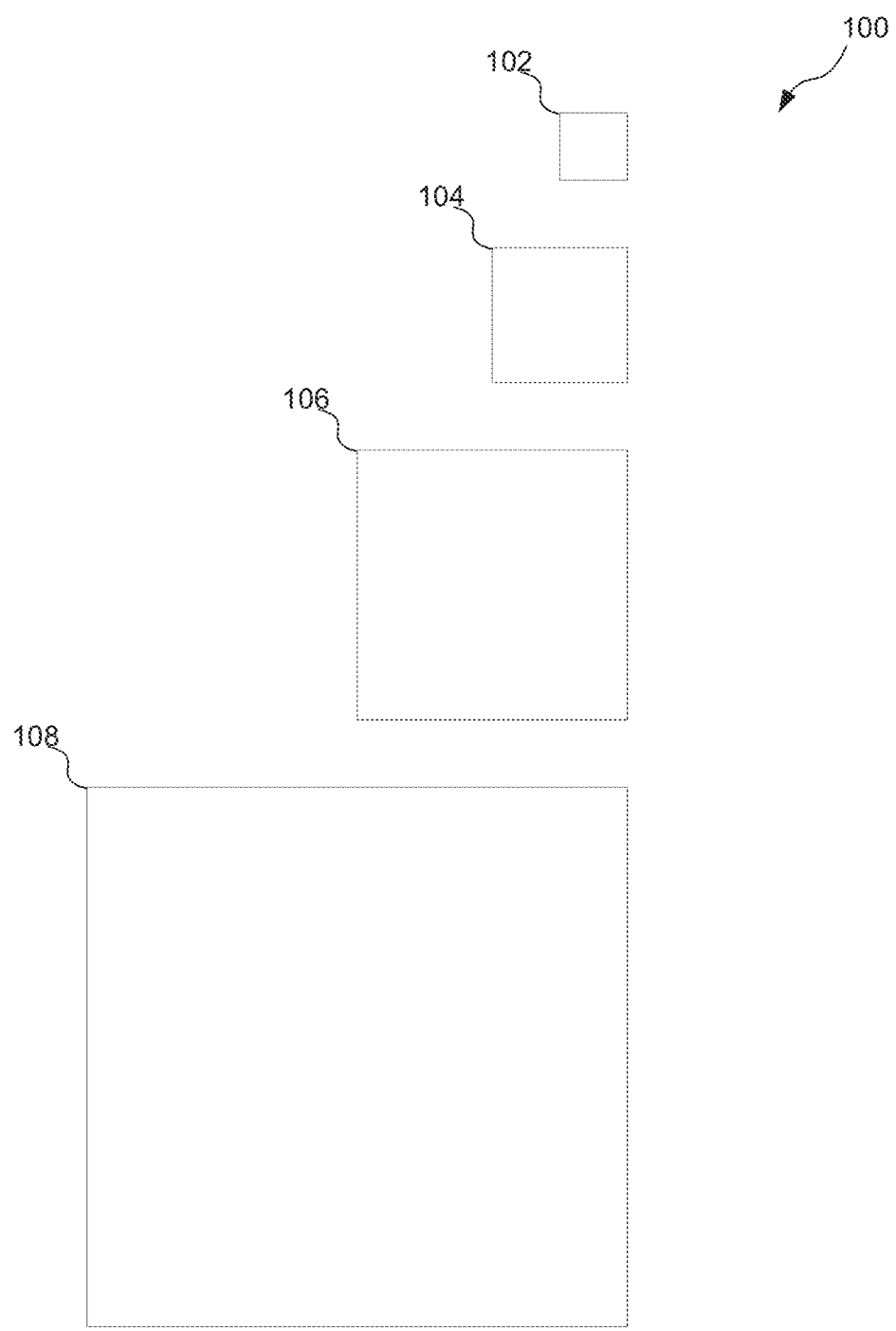
FIG. 1 shows a schematic illustration of a MIP-map.
Figure 2:
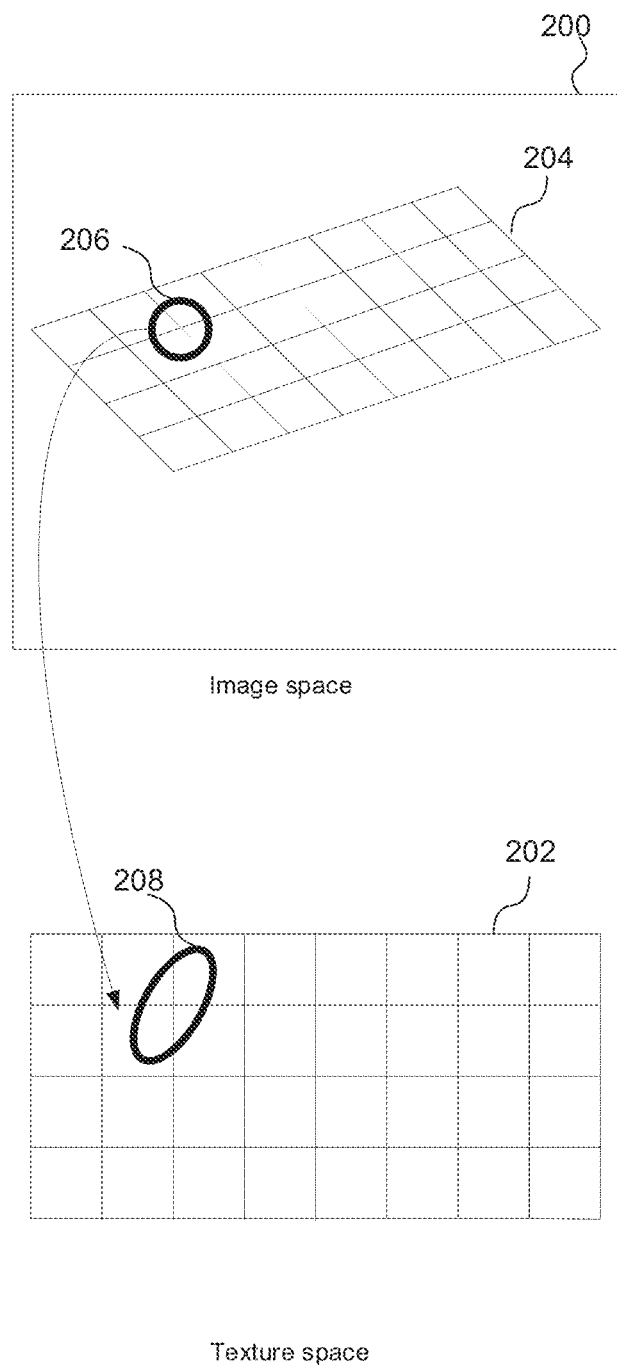
FIG. 2 shows a schematic illustration of a mapping of a sampling kernel between screen space and texture space.

The following description is presented by way of example to enable a person skilled in the art to make and use the invention. The present invention is not limited to the embodiments described herein and various modifications to the disclosed embodiments will be apparent to those skilled in the art. Embodiments are described by way of example only. In the following, like reference numerals denote like components.

The mapping between screen space and texture space for a sampling point in screen space (i.e., the mapping between screen space coordinates and texture space coordinates) can be approximated as an affine transformation. The affine approximation itself may be constructed from partial derivative vectors of the texture-space coordinates with respect to the screen-space coordinates. A set of orthogonal vectors (i.e., a pair of basis vectors) whose orthogonality is maintained under the affine approximation between screen space and texture space are referred to as the principal axes of the affine transformation. The principal axes may therefore refer to vectors in screen space (referred to herein as screen-space principal axes) or texture space (referred to herein as texture-space principal axes).

The principal axes comprise a minor axis and a major axis. The minor axis is the principal axis of the mapping with the minimum associated scale factor, and the major axis is the principal axis of the mapping with the maximum associated scale factor. In other words, the principal axes indicate maximum and minimum scale factors of the mapping between screen space and texture space. Put another way, the principal axes indicate maximum and minimum sampling rates along with their associated directions, with the major axis indicating the maximum sampling rate and its associated direction, and the minor axis indicating the minimum sampling rate and its associated direction.

As mentioned above, a point (e.g. pixel) sampled in screen space with a circular footprint has, in general, an elliptical footprint in texture space insofar as the texture mapping itself can be approximated by an affine mapping at the pixel's origin. To obtain a high-quality texture filtering result, the maximum and minimum scale factors of the mapping between screen space and texture space should be the major and minor axes respectively of the elliptical footprint in texture space, e.g. as specified in the DirectX® and Vulkan® specifications. In other words, the major axis of the elliptical footprint should indicate the maximum sampling rate and associated direction, and the minor axis of the elliptical footprint should indicate the minimum sampling rate and associated direction.

It can therefore be appreciated that is desirable to accurately calculate the principal axes of the transformation between screen space and texture space to accurately determine the sampling kernel in texture space to perform accurate texture filtering.

Figure 3:
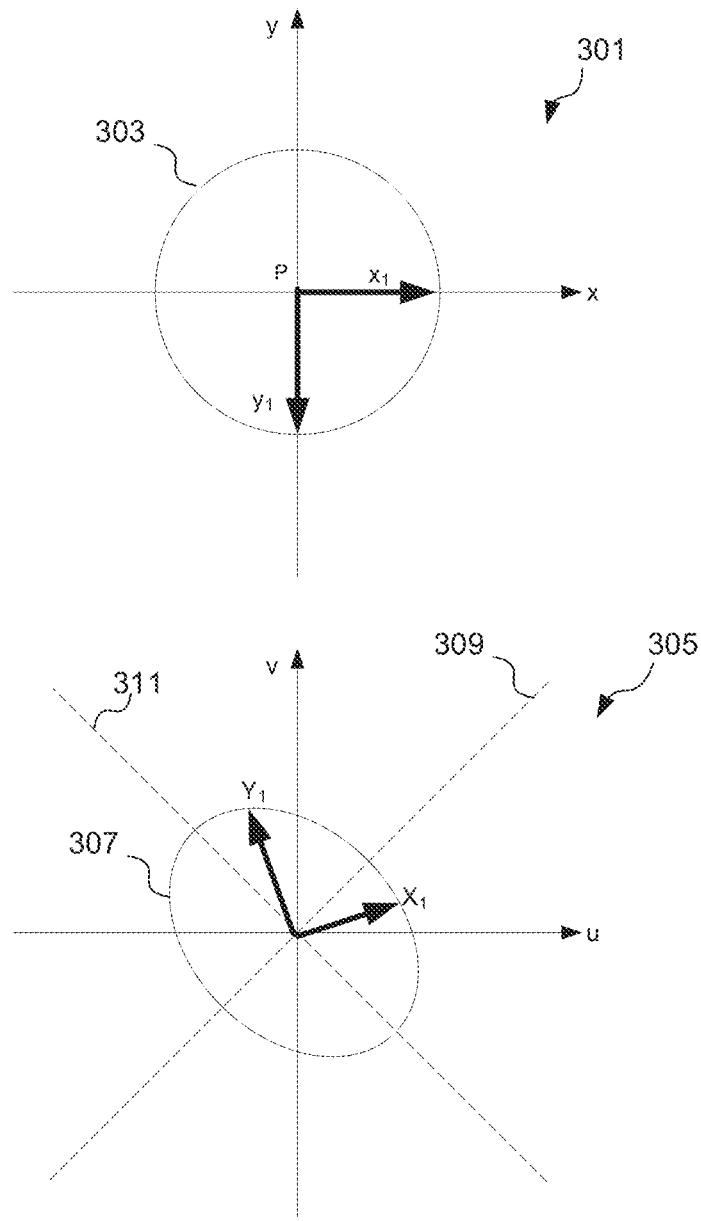
FIG. 3 shows the mapping of a pixel footprint in screen space to its footprint in texture space illustrating an approximation of the principal axes of the transformation.

FIG. 3 illustrates one approach to approximating the principal axes.

An example circular sampling footprint for a point P (e.g. a pixel) in screen space 301 is shown at 303. The screen space coordinates are denoted x and y. The footprint for point P in screen space maps to the ellipse 307 in texture space 305. The texture space coordinates are denoted u and v.

Under this approximation, the screen-space principal axes of the transformation between screen space 303 and texture space 305 are assumed to lie along the horizontal and vertical directions of screen space, denoted by the vectors $x_1$ and $y_1$. In the event the corresponding texture-space vectors $X_1$ and $Y_1$ are generated from partial derivatives of texture space coordinates relative to screen space coordinates, the major axis is taken to be the larger of the vectors in texture space 305 (vector $Y_1$ in this case). The partial derivative vectors may be written (for a two-dimensional screen space and texture space) as:

$$X_1 = \begin{pmatrix} \partial u/\partial x \\ \partial v/\partial x \end{pmatrix} \quad (1)$$

$$Y_1 = \begin{pmatrix} \partial u/\partial y \\ \partial v/\partial y \end{pmatrix} \quad (2)$$

where $X_1$ is the horizontal partial derivative vector and $Y_1$ is the vertical partial derivative vector.

Under this approximation, the transformed texture-space principal axes can be precomputed and supplied depending on whether the major axis is taken to lie along the vertical or horizontal direction in screen space. This approach enables the calculation of the true principal axes to be avoided. However, this approximation will only generate the correct texture-space principal axes (and hence the correct filtering kernel) in two circumstances: (1) when the true principal axes do in fact align with the horizontal and vertical axes of screen space; and (2) when the texture mapping is isotropic, and hence the sampling rate is the same in all directions (i.e. the sampling point's footprint in texture space is circular).

However, in general, this approximation will not generate the true principal axes of the mapping between screen space and texture space. As can be appreciated with reference to FIG. 3, the effect of this will be that the precomputed minor axis in texture space will overestimate the minimum scale factor of the mapping, and the precomputed major axis will underestimate the maximum scale factor of the mapping. In FIG. 3, the vector $X_1$ is the texture-space basis vector corresponding to the screen-space vector $x_1$, and the vector $Y_1$ is the texture-space basis vector corresponding to the screen-space vector $y_1$. In this example, $x_1$ is taken to be the screen-space minor axis and $y_1$ is taken to the screen-space major axis. The vector $X_1$ is therefore the approximation to the texture-space minor axis, and the vector $Y_1$ is the approximation to the texture-space major axis. The dashed line 309 denotes the direction of the true minor axis and the dashed line 311 denotes the direction of the true major axis. It can be seen any minor axis approximation not lying on the true minor axis will overestimate the minimum scale factor (the minor axis approximation being longer than the true minor axis) and any major axis approximation not lying on the true major axis will underestimate the maximum scale factor (the major axis approximation being shorter than the true major axis). This can lead to a texture-space filtering kernel being generated that performs inadequate texture filtering along both the major and minor axes, potentially leading to poor-quality images being rendered.

The present disclosure is directed to an approach for performing texture filtering that, for anisotropic mappings between screen space coordinates and texture coordinates, uses a filtering kernel calculated from more accurately-constructed principal axes. By more accurately calculating the principal axes, a texture filtering kernel can be generated that performs more adequate sampling along the directions of the major and minor axes. In one set of examples described herein, the principal axes are constructed from two pairs of screen-space basis vectors. As will be explained in more detail below, this means a level of detail (LOD) calculation used to configure a texture filter can be derived from more accurate principal axes that are constructed from two sets of simpler LOD calculations that each employ one set of screen-space basis vectors. This conveniently enables an efficient architectural implementation that utilises a single set of the two possible sets of LOD calculations if the output of the texture filter is isotropic, for example because anisotropic texture filtering is disabled, the texture mapping is determined to be isotropic (or approximately isotropic) or because of filtering limitations due to a limit on the range of available MIP map levels. In other words, anisotropic texture filtering with improved accuracy and quality of results can be performed from two sets of analogous LOD calculations that are each equivalent to an LOD calculation performed for an isotropic filtering operation.

The present disclosure will now be described in the context of a texture filtering system that implements MIP-maps. It will be appreciated that this is for the purposes of illustration only, and the techniques described herein can equally be implemented in texture-filtering systems that do not implement MIP-maps.

Figure 4:
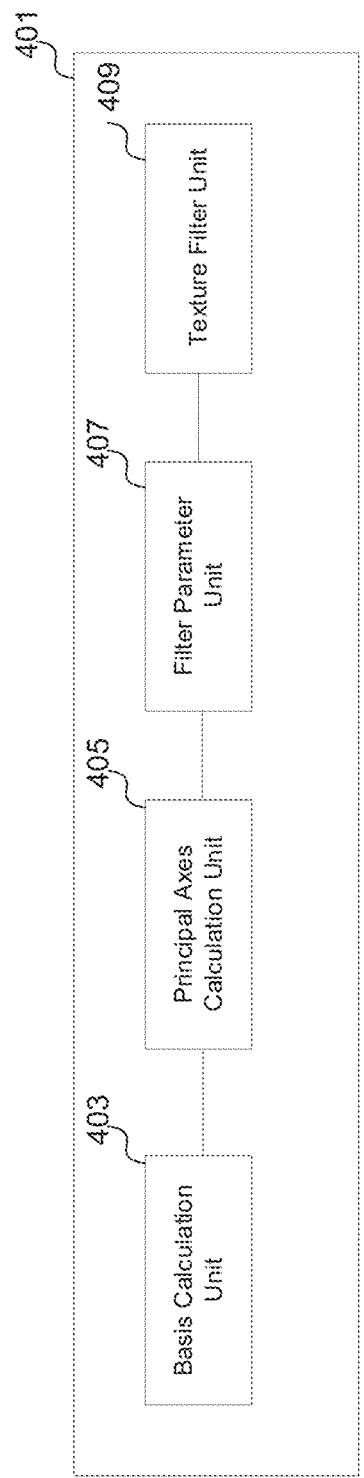
FIG. 4 shows an example of a texture filtering unit configured to perform texture filtering according to embodiments of the present invention.

FIG. 4 shows an example of a texture filter 401 configured to perform anisotropic texture filtering for a sampling point in screen space. The sampling point may be a pixel, for example. The texture filter 401 operates to anisotropically filter a texture to return one or more texture values for the sampling point in screen space. In this example, the texture filter 401 implements MIP-mapping, and performs texture filtering for a desired level of detail (LOD) by first performing texture filtering in two adjacent MIP-map levels (i.e. two adjacent level-of-detail (LOD)) above and below the desired LOD using an anisotropic texture filtering kernel. Linear interpolation may then be performed between the two filtered LOD to return a texture colour value at the desired intermediate LOD. The anisotropic texture filtering kernels are determined using constructed principal axes.

The texture filter 401 comprises a basis calculation unit 403, a principal axes calculation unit 405, a filter parameter unit 407 and a texture filter unit 409. In some implementations, each of units 403-409 may be implemented as separate, or distinct, hardware units.

The operation of the texture filter 401 to filter a texture for a sampling point in screen space will now be described with reference to the flowchart of FIG. 5.

At step 501, the texture filter 401 calculates texture filter parameters for a sampling point P in screen space. The sampling point is represented as a vector because it is specified in terms of screen-space coordinates. The texture filter parameters are calculated from principal axes of the mapping between screen space and texture space constructed from two pairs of screen-space basis vectors. The texture filter parameters are used to configure a texture filter (e.g. construct a texture filtering kernel) used to anisotropically filter the texture. The texture filter parameters may be used to construct a filtering kernel for multiple levels of detail. At step 503, the filter unit 409 filters the texture for the sampling point in screen space using a filtering kernel determined from the filtering parameters. In this example in which MIP-mapping is implemented, the texture may be filtered at two adjacent LOD, where the kernel used for each LOD is determined from the filtering parameters determined at step 501. The intermediate filtered results generated from these filtering operations may then be interpolated, or blended, to calculate a filtered result (e.g. texture colour) for the desired LOD residing between the two adjacent LOD of the MIP-map.

Step 501 of calculating the texture filter parameters will now be explained in more detail.

At step 505, a first and second pair of screen-space basis vectors are generated. This step is performed by the basis calculation unit 403.

The first pair of basis vectors are denoted $x_1$ and $y_1$, and the second pair of basis vectors are denoted $x_2$ and $y_2$. The vectors within each pair of screen-space basis vectors are orthogonal to each other; i.e. $x_1$ and $y_1$ are orthogonal to each other and $x_2$ and $y_2$ are orthogonal to each other. The first and second pair of basis vectors are rotated relative to each other and may also have reverse orientation (i.e. the role of $x_2$ and $y_2$ are exchanged), but share a common origin. In the example here, the first and second pair of basis vectors are rotated relative to each other by 45 degrees ($\pi/4$ radians) in screen space.

Figure 6:
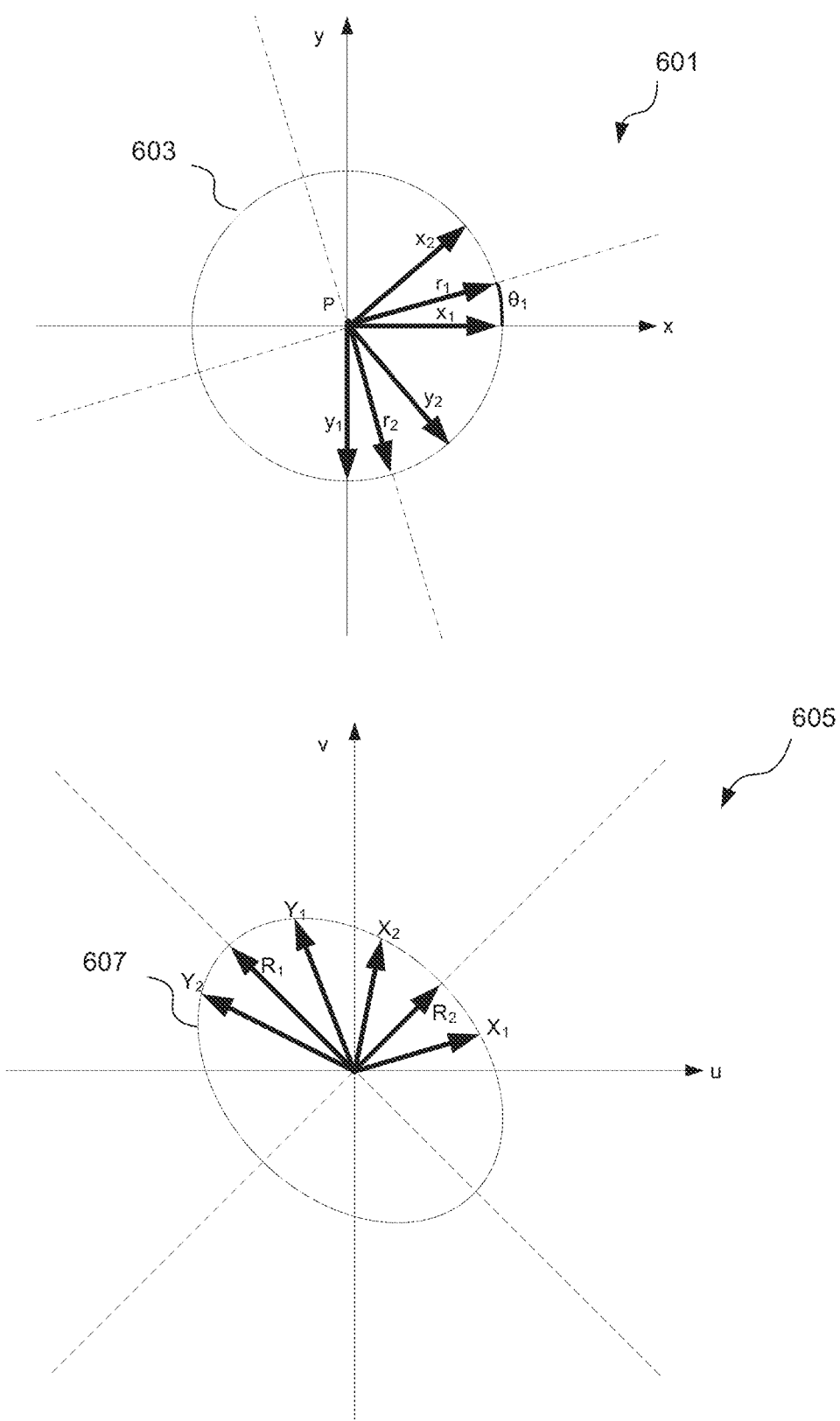
FIG. 6 shows the mapping of screen-space vectors to texture space illustrating the calculation of the principal axes of the transformation according to an embodiment of the invention.

The first and second pair of basis vectors are shown in FIG. 6 within a screen-space denoted generally at 601. The footprint of sampling point P is shown at 603. The screen-space coordinates (e.g. pixel coordinates) are denoted 'x' and 'y'. The basis vectors are local to the sampling point P for which texture filtering is to be performed. In the example shown here, the screen space basis vectors have as their origin the point P, but this need not be the case. In other examples, the basis vectors may originate from a point local to point P, e.g. within a specified number of sampling points (in the horizontal and/or vertical direction) of point P.

The first pair of texture space basis vectors $X_1$, $Y_1$ may be generated from approximated partial derivative vectors of the texture space coordinates relative to the screen-space coordinates local to the sampling point P. These partial derivatives represent the local affine approximation to the mapping between screen space 601 (in which the sampling point is defined using screen-space coordinates 'x' and 'y') and texture space 605 (in which the texture is addressed through texture coordinates 'u' and 'v'). Put another way, the affine approximation of the texture mapping can be constructed from the partial derivative vectors.

Figure 7:
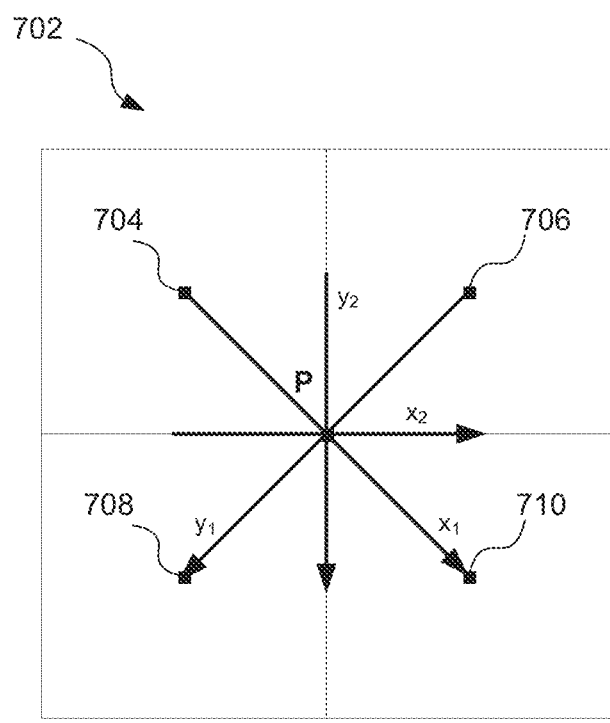
FIG. 7 shows finite differencing of diagonal elements of a 2×2 block of sampling points.

The partial derivative vectors may be approximated through finite differencing of a 2×2 block of texture sample coordinates. This is illustrated in FIG. 7. Block 702 is a 2×2 block of sampling points (e.g. pixels) in screen space local to sampling point P. Sampling point P could for example be one of the sampling points within the block. The block comprises a top-left sampling point 704, a top-right sampling point 706, a bottom-left sampling point 708 and a bottom-right sampling point 710. Each sampling point has its own screen-space coordinates and maps to corresponding texture coordinates in texture space 605. The partial derivative vectors (and hence the texture space basis vectors $X_1$, $Y_1$) are calculated from the difference in the texture coordinates corresponding to the diagonal sampling points 704-710 of the block 702 in screen space. Each basis vector $X_1$ and $Y_1$ is calculated from the difference in the texture coordinates in texture space corresponding to the respective diagonal sampling points of the block 702 in screen space. In this example, the basis vector $X_1$ is calculated from the difference between the texture coordinates corresponding to the top-left sampling point 704 and the bottom right sampling point 710 in screen space (i.e. the difference between the texture coordinates corresponding to sampling point 704 and the texture coordinates corresponding to sampling point 710), and the basis vector $Y_1$ is calculated from the difference between the texture coordinates corresponding to the top-right sampling point 706 and the bottom-left sampling point 708 (i.e. the difference between the texture coordinates corresponding to sampling point 706 and the texture coordinates corresponding to sampling point 708).

The second pair of screen space basis vectors $x_2$ and $y_2$ are also shown in FIG. 7, rotated 45 degrees relative to the basis vector pair $x_1$, $y_1$.

The basis calculation unit 403 can generate the second pair of texture space basis vectors $X_2$, $Y_2$ by performing finite differencing on the first pair of texture space basis vectors $X_1$, $Y_1$. In particular, the unit 403 can perform finite differencing of the first pair of basis vectors along the horizontal and vertical directions. This generates the basis vector pair $X_2$, $Y_2$ whose screen-space counterpart $x_2$, $y_2$ is rotated 45 degrees relative to the first basis vector pair $x_1$, $y_1$.

Constructing the basis vector pairs in this manner can provide a higher quality finite differencing scheme without increasing the computational cost per basis. By constructing the first pair of basis vectors from the diagonal sample points and then performing finite differencing on these vectors to generate the second pair of basis vectors, differences in texture coordinates in the horizontal and vertical directions are produced that are balanced around the centre of the 2×2 block 702. This is equivalent to averaging the differences for the top and bottom rows and the left and right columns of the block 702 but may be performed at a lower processing cost. In contrast, if for example the differences in texture coordinates between the sample points 706 and 704 were used for one basis vector, and the differences in texture coordinates between sample points 704 and 708 were used for the other basis vector (as is the default prescription in both the DirectX® and Vulkan® standards), the basis vectors (and hence the affine approximation of the texture mapping) would be biased towards the top-left sampling point 704. Furthermore, if the basis vectors are calculated in sequential fashion, the output bases of the first calculation can be used as the input to the second calculation, enabling both calculations to be performed by the same hardware unit. In other words, the calculation unit 403 can perform a first differencing calculation to generate a first pair of basis vectors, and then those vectors can be fed back as an input to the calculation unit 403 to perform a second, analogous, differencing operation to generate the second pair of basis vectors. Thus, a higher-quality gradient approximation can be generated without additional hardware cost compared to the approach prescribed by default in the DirectX® and Vulkan® standards.

An image rendered in accordance with the principles described herein comprises a set of sampled points, which, in order to produce a high quality reconstruction, are generated using (a set of) appropriate kernels with supports (footprints) that may be inversely related to the local density of sampling points. Rendered images are typically regular rectangular arrays, so the kernel footprints may generally be assumed to be uniform and circular. In principle, the screen-space sampling kernels could be elliptical (e.g. in order to sample more frequently perpendicular to a geometry interface), in which case a further intermediate mapping may be performed to convert between the orthogonal screen-space vectors and the texture-space vectors so as to effect the additional layer of anisotropy.

Though the above-described finite differencing scheme may be advantageous, it will be appreciated that other finite differencing schemes may be used to generate the texture space basis vectors for example using the columns and rows of a 2×2 block of sampling points, as opposed to the diagonals.

Referring back to FIG. 5, at step 507 the basis calculation unit 403 calculates first and second pairs of texture-space basis vectors corresponding to the first and second pairs of screen-space basis vectors respectively. The texture-space basis vectors are the screen-space basis vectors transformed to texture space using the local texture mapping.

The basis calculation unit 403 transforms the first pair of screen-space basis vectors $x_1$, $y_1$ to texture space using the local approximation of the texture mapping (i.e. the approximation of the mapping between a point local to sampling point P in screen space and texture space).

In general, the mapping to texture space of a vector x in screen space about a point P can, under the affine approximation, be written as:

$$t(P+x)-t(P)=t(P+ax_1+by_1)-t(P)=aX_1+bY_1 \qquad (3)$$

where t is the texture mapping from screen space to texture space, and $X_1$, $Y_1$ are the texture-space vectors corresponding to screen-space basis vectors $x_1$, $y_1$.

The basis calculation unit 403 calculates the texture-space vectors $X_1$, $Y_1$ from the screen-space basis vectors $x_1$, $y_1$ according to the equation:

$$X_1 = t(P + x_1) - t(P) \qquad (4)$$
$$Y_1 = t(P + y_1) - t(P)$$

The basis calculation unit 403 may similarly transform the second pair of screen-space vectors $x_2$, $y_2$ to texture space to generate the corresponding texture-space vectors $X_2$, $Y_2$ according to the equation:

$$X_2 = t(P + x_2) - t(P) \qquad (5)$$
$$Y_2 = t(P + y_2) - t(P)$$

Alternatively, using equation (3) and the knowledge that the vectors $x_2$, $y_2$ are rotated 45 degrees (i.e., π/4 radians) relative to vectors $x_1$, $y_1$, the basis calculation unit 403 may calculate the texture-space vectors $X_2$, $Y_2$ from the vectors $X_1$, $Y_1$ according to the equation:

$$X_2 = \frac{1}{\sqrt{2}}(X_1 - Y_1) \qquad (6)$$
$$Y_2 = \frac{1}{\sqrt{2}}(X_1 + Y_1)$$

Equation (6) is the expression for the basis vectors $X_2$ and $Y_2$ as the 45-degree rotations of $X_1$ and $Y_1$ respectively. In some implementations, the basis calculation unit 403 may elect to avoid explicitly scaling each additive term in equation (6) by $$\frac{1}{\sqrt{2}},$$

instead keeping track of this scaling factor where it may be evaluated at reduced cost in subsequent derived expressions.

At step 509, the principal axis calculation unit 405 determines the angular displacement between a selected pair of screen-space basis vectors and screen-space principal axes.

Referring back to FIG. 6, the screen-space principal axes are denoted $r_1$ and $r_2$. The angular displacement between the principal axes and the first pair of basis vectors is denoted $\theta_1$. The angular displacement between the principal axes and the second pair of basis vectors is not shown, for clarity, but is denoted $\theta_2$.

To calculate the unknown value of $\theta_1$, consider a pair of screen-space vectors $\tilde{x}_1$, $\tilde{y}_1$ rotated by an arbitrary angular displacement θ relative to the basis vectors $x_1$ and $y_1$. These vectors can be expressed in terms of the basis vectors as:

$$\tilde{x}_1 = \cos\theta x_1 - \sin\theta y_1 \qquad (7)$$
$$\tilde{y}_1 = \cos\theta y_1 + \sin\theta x_1$$

It follows from equation (3) that, transformed to texture space, the vectors can be expressed as:

$$\rho_1 = \cos\theta X_1 - \sin\theta Y_1 \qquad (8)$$
$$\rho_2 = \cos\theta Y_1 + \sin\theta X_1$$

where $\rho_1$ is the texture-space vector corresponding to $\tilde{x}_1$ and $\rho_2$ is the texture-space vector corresponding to $\tilde{y}_1$.

If $X_1$ and $Y_1$ are not orthogonal or their magnitudes are not equal, the vectors $\rho_1$ and $\rho_2$ trace out an ellipse in texture space 603, shown at 607 in FIG. 6.

As described above, the principal axes (and hence the major and minor axes) are orthogonal in texture space, since the orthogonality is preserved under the texture mapping. Thus, for $\rho_1$ and $\rho_2$ to be the texture-space principal axes, it follows that:

$$\rho_1 \cdot \rho_2 = 0 \qquad (9)$$

Substituting equation (8) into equation (9) for $\theta = \theta_1$ yields the following expression for the angle $\theta_1$:

$$\tan 2\theta_1 = \frac{-2 X_1 \cdot Y_1}{X_1 \cdot X_1 - Y_1 \cdot Y_1} \qquad (10)$$

$$\tan 2\theta_1 = \frac{\frac{1}{2}(X_1 - Y_1) \cdot (X_1 - Y_1) - \frac{1}{2}(X_1 + Y_1) \cdot (X_1 + Y_1)}{X_1 \cdot X_1 - Y_1 \cdot Y_1} \qquad (11)$$

Using equation (6), the expression becomes:

$$\tan 2\theta_1 = \frac{X_2 \cdot X_2 - Y_2 \cdot Y_2}{X_1 \cdot X_1 - Y_1 \cdot Y_1} \qquad (12)$$

An analogous expression for the angular displacement $\theta_2$ between the second pair of screen-space basis vectors $x_2$, $y_2$ and the screen-space principal axes $r_1$, $r_2$ can be written as:

$$\tan 2\theta_2 = \frac{Y_1 \cdot Y_1 - X_1 \cdot X_1}{X_2 \cdot X_2 - Y_2 \cdot Y_2} \qquad (13)$$

Equation (12) says that a pair of screen-space orthogonal vectors $\tilde{x}_1$, $\tilde{y}_1$ rotated by $\theta_1$ relative to the basis vectors $x_1$, $y_1$ where $\theta_1$ is specified according to equation (12)) transform to orthogonal texture-space basis vectors $\rho_1$ and $\rho_2$; i.e. the orthogonality is preserved under the texture mapping and so $\tilde{x}_1$, $\tilde{y}_1$ are the screen-space principal axes and $\rho_1$ and $\rho_2$ are the corresponding texture-space principal axes. Equation (13) says that the screen-space principal axes can also be expressed as the orthogonal vectors $\tilde{x}_1$, $\tilde{y}_1$ rotated by $\theta_2$ relative to the basis vectors $x_2$, $y_2$.

It can be seen that the expressions for both $\theta_1$ and $\theta_2$ depend only on the differences in the (squared) vector length between the vectors of each basis pair. Thus, an expression for the angular displacement between each pair of screen-space basis vectors and the principal axes can be determined from the differences in vector lengths of the texture-space basis vectors.

The principal axis calculation unit 405 can therefore receive the first pair of texture-space vectors $X_1$, $Y_1$ and the second pair of texture-space vectors $X_2$, $Y_2$ and calculate from these an expression for the angular displacement to the principal axes from the screen-space vectors $x_1$, $y_1$ and/or $x_2$, $y_2$ in accordance with equations (12) and (13). The unit 405 can then calculate the sine and cosine of the angular displacement to enable the screen-space basis vectors $x_1$, $y_1$ or $x_2$, $y_2$ to be rotated onto the principal axes and mapped to texture space, described in more detail below with respect to step 511.

Because either pair of screen-space basis vectors can be rotated onto the principal axes, the principal axes calculation unit 405 may select either the first pair of basis vectors $x_1$, $y_1$ or the second pair of basis vectors $x_2$, $y_2$ to be rotated onto the principal axes. In some examples, the unit 405 may select one of the pairs of basis vectors by default. In other examples, the unit 405 may select the pair of basis vectors that is closest to the screen-space principal axes, i.e. the pair of screen-space principal axes having the smaller angular displacement θ to the principal axes. Choosing the screen-space basis vectors in this manner may yield certain advantages within a practical implementation, described below.

In some implementations, the unit 405 may use a pre-stored table of values (e.g. a look-up table (LUT)) to calculate values of sin θ and cos θ for corresponding values of tan 2θ calculated in accordance with equations (12) and/or (13). This LUT may be stored in memory, e.g. within the texture filtering unit 401 or in an external memory accessible by the unit 405. Conveniently, because the first and second pairs of screen-space basis vectors $x_1$, $y_1$ and $x_2$, $y_2$ are rotated 45 degrees relative to each other, the screen-space principal axes are rotated by at most 22.5 degrees relative to the nearest basis vector pair. Compared to if only a single pair of screen-space basis vectors were generated, this enables the size of the LUT storing the values of sin θ and cos θ to be reduced in size for a given resolution of stored values, or enables the resolution of stored values to be increased for a given storage size of the LUT.

Thus, the unit 405 may choose the pairs of screen-space basis vectors closest to the principal axes as the pair to be rotated onto the principal axes.

To select the basis vector pair, the unit 405 may calculate an expression for the angular displacement $\theta_1$ between the first pair of screen-space basis vectors and the principal axes (e.g. in accordance with equation (12)) and an expression for the angular displacement $\theta_2$ between the second pair of screen-space basis vectors and the principal axes (e.g. in accordance with equation (13)), and then from the calculated expressions select the pair of basis vectors with the smaller angular displacement from the principal axes.

Referring again to equations (12) and (13), for example, it follows that if $|\tan 2\theta_1| < 1$ then $|\tan 2\theta_2| > 1$, and vice versa: if $|\tan 2\theta_2| < 1$ then $|\tan 2\theta_1| > 1$. Thus, the unit 405 may select the basis vector pair $x_i$, $y_i$ for which the angular displacement $\theta_i$ to the screen-space principal axes is such that $|\tan 2\theta_i| < 1$.

Alternatively, the unit 405 may select the screen-space basis vector pair to be rotated from a comparison of the differences in vector lengths of the corresponding texture-space pairs $X_1$, $Y_1$ and $X_2$, $Y_2$. More specifically, the texture-space vector pair having the greatest difference in vector lengths between the vectors of that pair can be identified, and the corresponding screen-space basis vector pair chosen as the selected pair. Expressed mathematically, the unit 405 may calculate $|X_1 \cdot X_1 - Y_1 \cdot Y_1|$ and $|X_2 \cdot X_2 - Y_2 \cdot Y_2|$ and from the value of these expressions choose the screen-space basis vector pair having the smallest angular displacement to the principal axes. If the vector pair $X_1$, $Y_1$ has the greatest difference in vector lengths, it can be seen from equations (12) and (13) that $|\tan 2\theta_1| < 1$ and $|\tan 2\theta_2| > 1$ and that the corresponding screen-space basis pair $x_1$, $y_1$ therefore has the smallest angular displacement to the principal axes. In contrast, if the vector pair $X_2$, $Y_2$ has the greatest difference in vector lengths, it can be seen from equations (12) and (13) that $|\tan 2\theta_1| > 1$ and $|\tan 2\theta_1| < 1$ and that the corresponding screen-space basis pair $x_2$, $y_2$ therefore has the smallest angular displacement to the principal axes. Having selected a screen-space basis pair of vectors, the unit 405 can then calculate the angular displacement between that selected basis pair and the screen-space principal axes.

In another example, the screen-space vector pair corresponding to the texture-space pair having the most extremal length is chosen as the selected pair. That is, the texture-space pair for which either basis vector of that pair is either greater in length or smaller in length than both basis vectors of the other texture-space pair is identified, and the corresponding screen-space pair chosen as the selected pair.

At step 511 the principal axes calculation unit 405, having determined the angular displacement between the selected screen-space basis vector pair and the principal axes, implicitly rotates the selected screen-space basis vector pair by the determined angular displacement (i.e. rotates the selected basis vector pair onto the screen-space principal axes) and then maps that rotated basis pair to texture space to generate the texture-space principal axes. This may be achieved by mapping the rotation matrix to texture space and using the texture-space basis vectors directly, in accordance with equation (8).

With reference to FIG. 6, the principal axes calculation unit 405 rotates one of the basis pairs $x_1$, $y_1$ and $x_2$, $y_2$ in screen space 601 by the determined angular displacement to generate the screen-space principal axes $r_1$, $r_2$. The screen-space principal axes are then mapped to texture space 605 to generate the texture-space principal axes $R_1$, $R_2$. The principal axes comprise a major axis ($R_1$ in the example shown in FIG. 6) and a minor axis ($R_2$ in the example shown in FIG. 6) representing the maximum and minimum scale factors respectively of the mapping between screen space 601 and texture space 605.

Rotation of a vector in screen space can be implemented by applying a rotation matrix to that vector. As can be appreciated from equation (3), terms of the rotation matrix applied to the vector in screen space are maintained under the transform and applied to the corresponding vectors in texture space. In other words, the unit 405 can implement step 511 by multiplying the texture-space vectors corresponding to the selected screen-space basis vectors by appropriate terms of the rotation matrix set by the calculated angular displacement.

Expressed mathematically, the principal axes calculation unit 405 can rotate the selected basis into the texture-space principal axes by performing the following calculations:

$$\rho_{minor} = \begin{cases} \cos\theta\rho_{min} + \sin\theta\rho_{max} & \text{if clockwise rotation} \\ \cos\theta\rho_{min} - \sin\theta\rho_{max} & \text{if anticlockwise rotation} \end{cases} \quad (14)$$

-continued $$\rho_{major} = \begin{cases} \cos\theta\rho_{max} - \sin\theta\rho_{min} & \text{if clockwise rotation} \\ \cos\theta\rho_{max} + \sin\theta\rho_{min} & \text{if anticlockwise rotation} \end{cases} \quad (15)$$

where $\rho_{minor}$ is the texture-space minor axis, $\rho_{major}$ is the texture-space major axis, $\theta$ is the angular displacement between the selected screen-space basis vectors and principal axes, $\rho_{min}, \rho_{max} \in X_1, Y_1$ if the selected basis is $x_1, y_1$ where $\rho_{min}=X_1$, $\rho_{max}=Y_1$ if $|X_1|^2 < |Y_1|^2$ and $\rho_{min}=Y_1$, $\rho_{max}=X_1$ if $|X_1|^2 \geq |Y_1|^2$; and $\rho_{min}, \rho_{max} \in X_2, Y_2$ if selected basis is $x_2, y_2$ where $\rho_{min}=X_2$, $\rho_{max}=Y_2$ if $|X_2|^2 < |Y_2|^2$ and $\rho_{min}=Y_2$, $\rho_{max}=X_2$ if $|X_2|^2 \geq |Y_2|^2$.

The values of $|X_1|^2, |Y_1|^2, |X_2|^2, |Y_2|^2$ may be calculated by either the basis calculation unit 403 or the principal axes calculation unit 405.

It is noted that a 45 degree rotational offset between the first and second screen-space basis vector pairs can conveniently benefit the rotation operation performed by unit 405 by restricting the range of values featuring in the multiplicative terms in equations (14) and (15), limiting the size of introduced errors. Limiting the amount of rotation can also reduce the amount of error-magnifying cancellation in the additive terms in the rotational calculations.

In one implementation, the principal axes calculation unit 405 may perform step 511 by performing the following steps:

1) calculate parameters $\sigma_1, \sigma_2$, where:

$$\sigma_1 = \begin{cases} -1 & \text{if } |X_1|^2 < |Y_1|^2 \\ 1 & \text{if } |X_1|^2 \geq |Y_1|^2 \end{cases} \quad (16)$$

$$\sigma_2 = \begin{cases} -1 & \text{if } |X_2|^2 < |Y_2|^2 \\ 1 & \text{if } |X_2|^2 \geq |Y_2|^2 \end{cases} \quad (17)$$

2) calculate parameters $\rho_{min,1}, \rho_{min,2}, \rho_{max,1}, \rho_{max,2}, \delta_1$ and $\delta_2$, where:

$$\rho_{min,1} = \begin{cases} X_1 \\ Y_1 \end{cases}, \rho_{max,1} = \begin{cases} Y_1 \\ X_1 \end{cases}, \delta_1 = \begin{cases} |Y_1|^2 - |X_1|^2 & \text{if } \sigma_1 = -1 \\ |X_1|^2 - |Y_1|^2 & \sigma_1 = 1 \end{cases} \quad (18)$$

and $$\rho_{min,2} = \begin{cases} X_2 \\ Y_2 \end{cases}, \rho_{max,2} = \begin{cases} Y_2 \\ X_2 \end{cases}, \delta_2 = \begin{cases} |Y_2|^2 - |X_2|^2 & \text{if } \sigma_2 = -1 \\ |X_2|^2 - |Y_2|^2 & \sigma_2 = 1 \end{cases} \quad (19)$$

3) calculate parameters $\sigma_0, \rho_{min}, \rho_{max}$, where:

$$\sigma_0 = \begin{cases} -1 & \text{if } \delta_1 < \delta_2 \\ 1 & \text{if } \delta_1 \geq \delta_2 \end{cases} \quad (20)$$

$$\rho_{min} = \begin{cases} \rho_{min,2} \\ \rho_{min,1} \end{cases}, \rho_{max} = \begin{cases} \rho_{max,2} \\ \rho_{max,1} \end{cases}, \text{if } \begin{matrix} \sigma_0 = -1 \\ \sigma_0 = 1 \end{matrix} \quad (21)$$

4) calculate the texture-space principal axes according to the equations:

$$\rho_{minor} = \cos\theta\rho_{min} + \sigma_0\sigma_1\sigma_2 \sin\theta\rho_{max} \quad (22)$$

$$\rho_{major} = \cos\theta\rho_{max} - \sigma_0\sigma_1\sigma_2 \sin\theta\rho_{min} \quad (23)$$

The values of $\sin\theta$ and $\cos\theta$ may be calculated from the expression for the angular displacement given by equation (12) or (13), e.g. using a LUT as described above.

Thus, following the conclusion of step 511, the principal axes calculation unit 405 has calculated the texture-space principal axes which include a major axis indicating the maximum scale factor of the texture mapping, and a minor axis indicating the minimum scale factor of the texture mapping.

At step 513, the filter parameter unit 407 calculates texture filter parameters from the calculated major and minor axes.

The filter parameter unit 407 calculates filter parameters to configure the texture filter unit 409.

The filter parameters can be used to set, or determine, the footprint of the filter used by the texture filter unit 409 to filter the texture for the sample point P.

The filter parameters, and the configuration of the texture filter itself, may vary depending on implementation, for example depending on the application programming interface (API) being implemented. Example APIs include, for example, Vulkan and DirectX.

One parameter that is specified by several APIs and used for texture filtering is the level of detail (LOD) parameter. For convenience, the LOD parameter will be referred to herein using the notation $\lambda$, which is the same notation used in the Vulkan API specification. The LOD parameter is used to calculate the MIP-map levels of the texture to filter for the sampling point. For anisotropic filtering, the LOD parameter can be calculated from the major and minor axes of the texture mapping, $\rho_{minor}$ and $\rho_{major}$. From the LOD parameter $\lambda$, the filter parameter unit 407 can calculate an image-level parameter, from which MIP-map levels in which texels are filtered can be calculated. Depending on the type of MIP-map mode implemented, a single image level d may be calculated from the image level parameter, or two MIP-map levels, $d_{hi}$ and $d_{lo}$ can be calculated. The image level parameter will be referred to herein as $d_l$, which is the same notation used in the Vulkan specification. The parameter $d_{hi}$ refers to a higher MIP-map level (i.e. a more detailed MIP-map level) and the parameter $d_{lo}$ refers to a lower MIP-map level (i.e. a less detailed MIP-map level). The levels $d_{hi}$ and $d_{lo}$ may be neighbouring levels. Both the higher and lower MIP-map levels may be filtered, with the filtered values levels then being filtered, or blended, to produce a final filtered value.

One example way to compute the LOD parameter $\lambda$ is as follows. In this example, the LOD parameter is calculated in accordance with the requirements of the Vulkan specification.

Firstly, the filter parameter unit 407 calculates an intermediate parameter $\lambda_{compute}$, where:

$$\lambda_{compute} = \max(\log_2(\rho_{min}), \log_2(\rho_{max}) - \log_2(\max_{Aniso})) \quad (24)$$

where $\max_{Aniso}$ is the maximum anisotropic ratio supported by the filtering unit 401. Thus, the filter parameter unit 407 calculates the intermediate parameter $\lambda_{compute}$ from the major and minor axes of the texture mapping, $\rho_{minor}$ and $\rho_{major}$.

Having computed the intermediate parameter $\lambda_{compute}$, the unit 407 performs calculations on this parameter to calculate the LOD parameter $\lambda$. One example is LOD biasing, whereby an offset is applied to the calculated LOD, for the purposes of adjusting the resolution of the final textured result. The Vulkan specification, for example, provides for a sampler bias and a 'shaderOp' bias. A second example is LOD clamping, which limits the range of the calculated LOD and hence the resampling requirements of the texture filter. The value of the LOD parameter $\lambda$ can then be computed from the composite bias and clamp operations acting on the intermediate LOD parameter in dependence on the value of the intermediate parameter, the LOD bias, and specified maximum and minimum parameter values.

With reference to the Vulkan specification. expressed mathematically, the LOD parameter $\lambda$ may be calculated by calculating a base LOD parameter value, $\lambda_{base}$, by selecting between the intermediate parameter $\lambda_{compute}$ and a shader-specified value, denoted 'shaderOp. Lod':

$$\lambda_{base} = \begin{cases} shaderOp.Lod \\ \lambda_{compute} \end{cases} \quad (25)$$

A bias is then applied to the base parameter $\lambda_{base}$ to generate a biased intermediate parameter, $\lambda'$, as:

$$\lambda' = \lambda_{base} + \text{bias} \quad (26)$$

Finally, the clamped LOD parameter $\lambda$ is computed in dependence on the value of the biased intermediate parameter $\lambda'$ and specified maximum and minimum parameter values. Specifically, the LOD parameter is calculated as:

$$\lambda = \begin{cases} lod_{max} & \lambda' > lod_{max} \\ \lambda' & lod_{min} \leq \lambda' \leq lod_{max} \\ lod_{min} & \lambda' < lod_{min} \\ \text{undefined} & lod_{min} > lod_{max} \end{cases} \quad (27)$$

where $lod_{max}$ is the specified maximum LOD parameter and $lod_{min}$ is the specified minimum LOD parameter. The values of the maximum and minimum LOD parameters may be implementation specific.

The filter parameters might further include the direction of anisotropy. The direction of anisotropy may determine the orientation of the filtering kernel in texture space, e.g. the direction along which texels are filtered. The direction of anisotropy may be determined from the calculated major axis vector, $\rho_{major}$. In other words, the texture may be filtered along the direction of the major axis.

The filter parameter unit 407 may further calculate an anisotropic LOD parameter, denoted µ The anisotropic LOD parameter may be calculated from the magnitude of the major axis, $\rho_{major}$.

Conveniently, the filter parameter unit 407 might calculate the anisotropic filter parameter µ by performing an analogous set of calculations to those performed for the LOD parameter $\lambda$. Thus, the filter parameter unit 407 might calculate an intermediate anisotropic parameter from the magnitude of the major axis, and then perform an analogous set of calculations (including application of the same or similar clamping) to that intermediate parameter to those performed for the LOD parameter $\lambda$ to calculate the anisotropic parameter µ.

Thus, one example way to calculate the anisotropic parameter µ in accordance with the requirements of the Vulkan specification is as follows:

Firstly, the filter parameter unit 407 calculates an intermediate parameter $\mu_{compute}$ according to the expression:

$$\mu_{compute} = \log_2(|\rho_{major}|) \quad (28)$$

Having computed the parameter $\mu_{compute}$, the unit 407 performs calculations on this parameter to calculate the anisotropic LOD parameter µ. An example of the calculations performed is clamping, where clamps are applied to an intermediate anisotropic LOD parameter. The Vulkan specification, for example, provides for a sampler bias and a 'shaderOp' bias. The value of the anisotropic LOD parameter µ can then be computed from the intermediate anisotropic LOD parameter in dependence on the value of the intermediate parameter and specified maximum and minimum parameter values.

Expressed mathematically, the anisotropic LOD parameterµ may be calculated by calculating a base LOD parameter value, $\mu_{base}$, by selecting between the intermediate parameter $\mu_{compute}$ and a shader-specified value, denoted 'shaderOp. Lod':

$$\mu_{base} = \begin{cases} shaderOp.Lod \\ \mu_{compute} \end{cases} \quad (29)$$

A bias is then applied to the base parameter $\mu_{base}$ to generate a biased intermediate parameter, µ', as:

$$\mu' = \mu_{base} + \text{clamp} \quad (30)$$

Finally, the clamped anisotropic LOD parameter µ is computed in dependence on the value of the biased intermediate parameter µ' and specified maximum and minimum parameter values. Specifically, the anisotropic LOD parameter is calculated as:

$$\mu = \begin{cases} lod_{max} & \mu' > lod_{max} \\ \mu' & lod_{min} \leq \mu' \leq lod_{max} \\ lod_{min} & \mu < lod_{min} \\ \text{undefined} & lod_{min} > lod_{max} \end{cases} \quad (31)$$

where $lod_{max}$ is the specified maximum LOD parameter and $lod_{min}$ is the specified minimum LOD parameter defined above with respect to (27).

The anisotropic filter kernel widths (in texels) can be computed from this anisotropic LOD parameter, µ. In some implementations, the filter kernel width for each MIP-map level (d, or $d_{hi}$ and $d_{lo}$) can be computed. The kernel width for each MIP-map level can be computed using the image level parameter, which is in turn calculated from the LOD parameter.

Computing the LOD parameters $\lambda$ and µ by performing an analogous set of calculations in the manner described above can present several advantages. In effect, the filter parameter unit 407 calculates the LOD parameters $\lambda$ and µ for anisotropic filtering by performing two isotropic LOD parameter calculations. Conveniently, this can avoid over filtering that can occur when the anisotropic ratio (and associated sampling rate) is determined independently of any clamping applied to the LOD parameter $\lambda$. Applying the same or similar clamping to both $\lambda$ and µ, and determining the anisotropic sampling rate after such calculations have been performed can prevent a shift in the LOD parameter $\lambda$ leading to a spurious shift in the anisotropic LOD µ, which contrasts to situations where the parameter µ is defined implicitly via $\lambda$ and the inherent eccentricity of the ellipse. It is also noted that the symmetry in clamping operations between the parameters $\lambda$ and µ means no further consideration need to be made for the texture filter's maximum supported anisotropic ratio (beyond the clamping in the definition of $\lambda_{compute}$, in contrast with the canonical DirectX implementation) because the clamping will not lead to a reversal in the order of the minor and major LODs.

It can be convenient to parametrise the anisotropic filter by the anisotropic ratio which may be calculated as $2^{\mu-\lambda}$.

Having calculated the texture filter parameters from the texture-space principal axes, the filter parameter unit 407 communicates the values of the parameters to the texture filter unit 409. The texture filter unit 409 then performs texture filtering using a texture filter configured using the filter parameters (step 503). Thus, the footprint of the texture filter (in texture space) may be determined using the calculated filter parameters.

In this example, where MIP-mapping is implemented, the filter unit 409 performs texture filtering in each MIP-map level $d_{hi}$ and $d_{lo}$ using a filter that, for each level, is configured using the relevant filter parameters (e.g. the footprint of the filter within each MIP-map level can be determined using the calculated filter parameters). The filtering in each MIP-map level generates intermediate filtered values that can then be filtered (e.g. bi-linearly) or blended by filter unit 409 to generate a final filtered value for the sampling point P.

The type of filter used to filter the texture may be implementation-specific, but could be, for example, a Gaussian filter.

Described above is an approach to performing anisotropic texture filtering using a texture filter configured with filter parameters determined from calculated principal axes of the texture mapping. Constructing the principal axes in the manner described above provides an accurate approximation of the anisotropic filter kernel distortion, which in turn can improve the quality of the texture filtering and reduce the artefacts caused by inadequate filtering along the direction of anisotropy that can result from a poor approximation of the principal axes.

In practice, it may be desirable to not be required to perform anisotropic filtering for each filtering operation. This may be for reasons of performance (anisotropic filtering is typically more computationally expensive than isotropic filtering) or because the texture mapping is isotropic, or isotropic to within a specified amount; for example sufficiently close to isotropic that performing anisotropic filtering does not substantially improve the quality of the filtering results.

Figure 8:
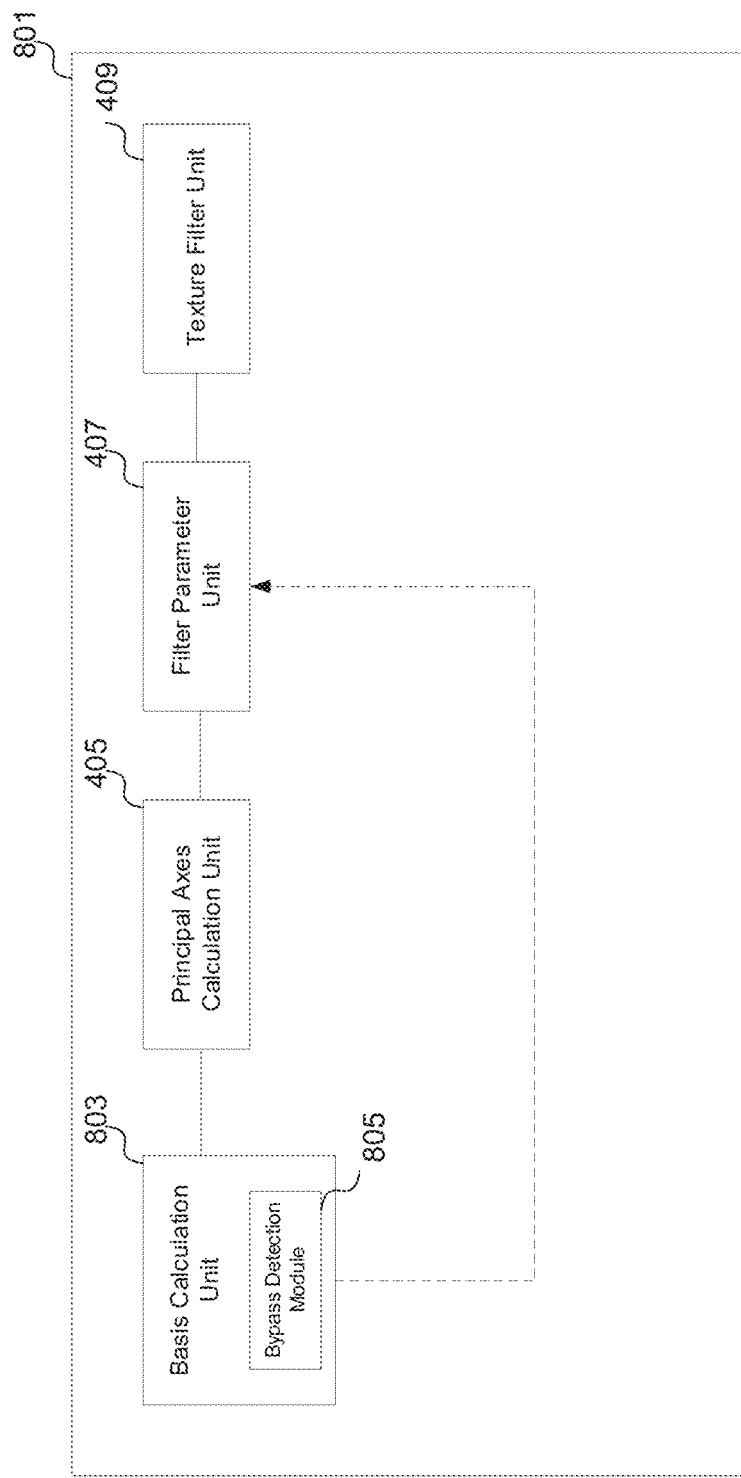
FIG. 8 shows an example of a texture filtering unit configured to perform anisotropic and isotropic texture filtering.

FIG. 8 shows a texture filter 801 configured to perform isotopic and anisotropic texture filtering.

The texture filter 801 comprises a basis calculation unit 803, principal axes calculation unit 405, filter parameter unit 407 and texture filter unit 409. The basis calculation unit 803 comprises a bypass detection module 805.

Figure 9:
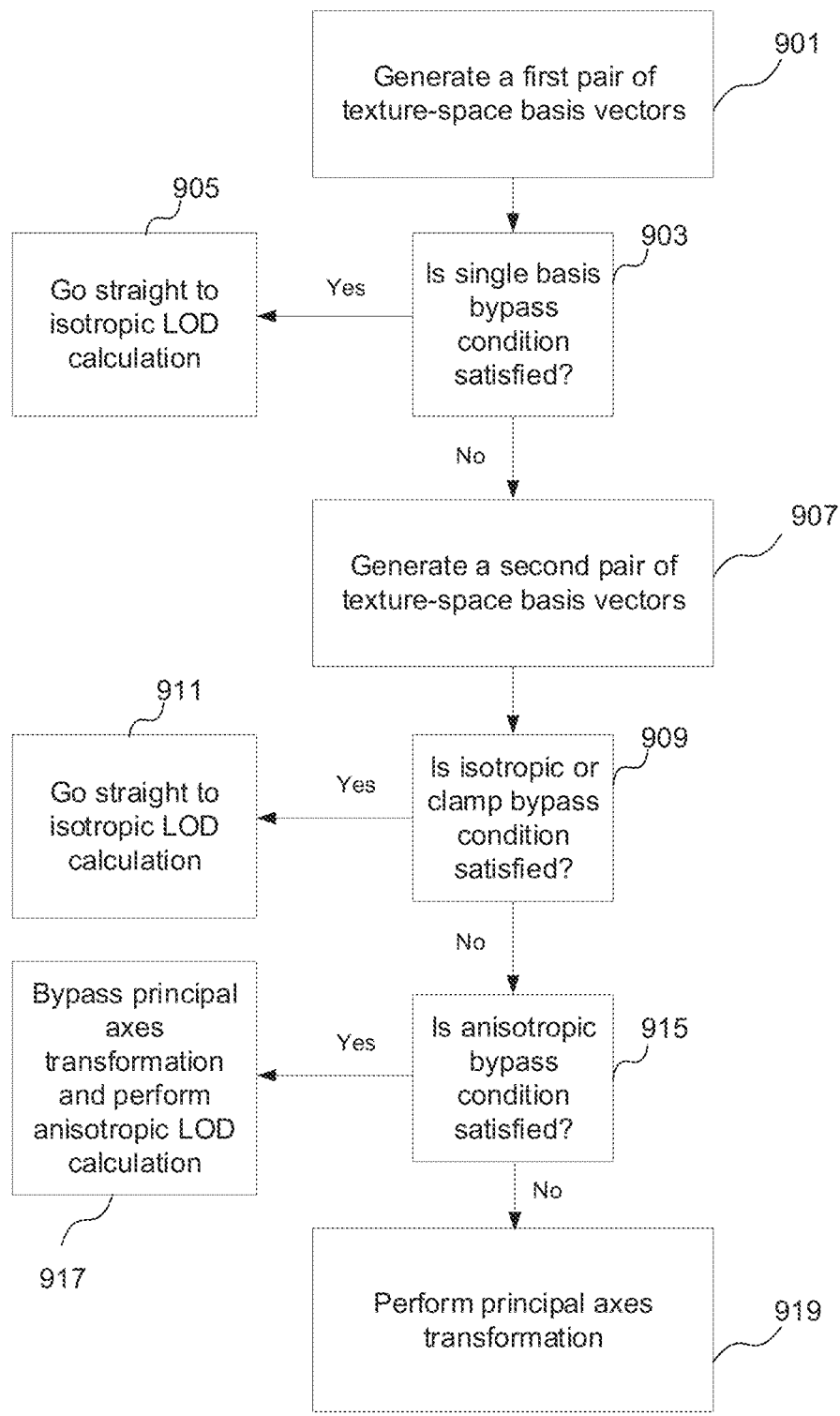
FIG. 9 is a flowchart of steps for performing texture filtering implementing bypass conditions enabling steps of the principal axes calculations to be omitted.

The bypass detection module 805 is configured to detect whether one or more bypass conditions have been met for a given texture filtering operation. If the module 805 detects that a bypass condition has been met, the module causes the principal axes calculation unit 405 to be bypassed and instead outputs one or more pairs of texture-space vectors directly to the filter parameter unit 407. The filter parameter unit 407 can then calculate isotropic texture filter parameters and use these parameters to configure the filter unit 409 to perform isotropic texture filtering. In other words, the bypass detection module 805 detects whether a bypass condition has been met and, if so, outputs one or more pairs of texture-space vectors generated by the basis calculation unit 803 to the filter parameter unit 407, thereby avoiding the need to calculate the anisotropic principal axes within the principal axes calculation unit 405. A flowchart illustrating an exemplary approach for testing bypass conditions is shown in FIG. 9.

Figure 5:
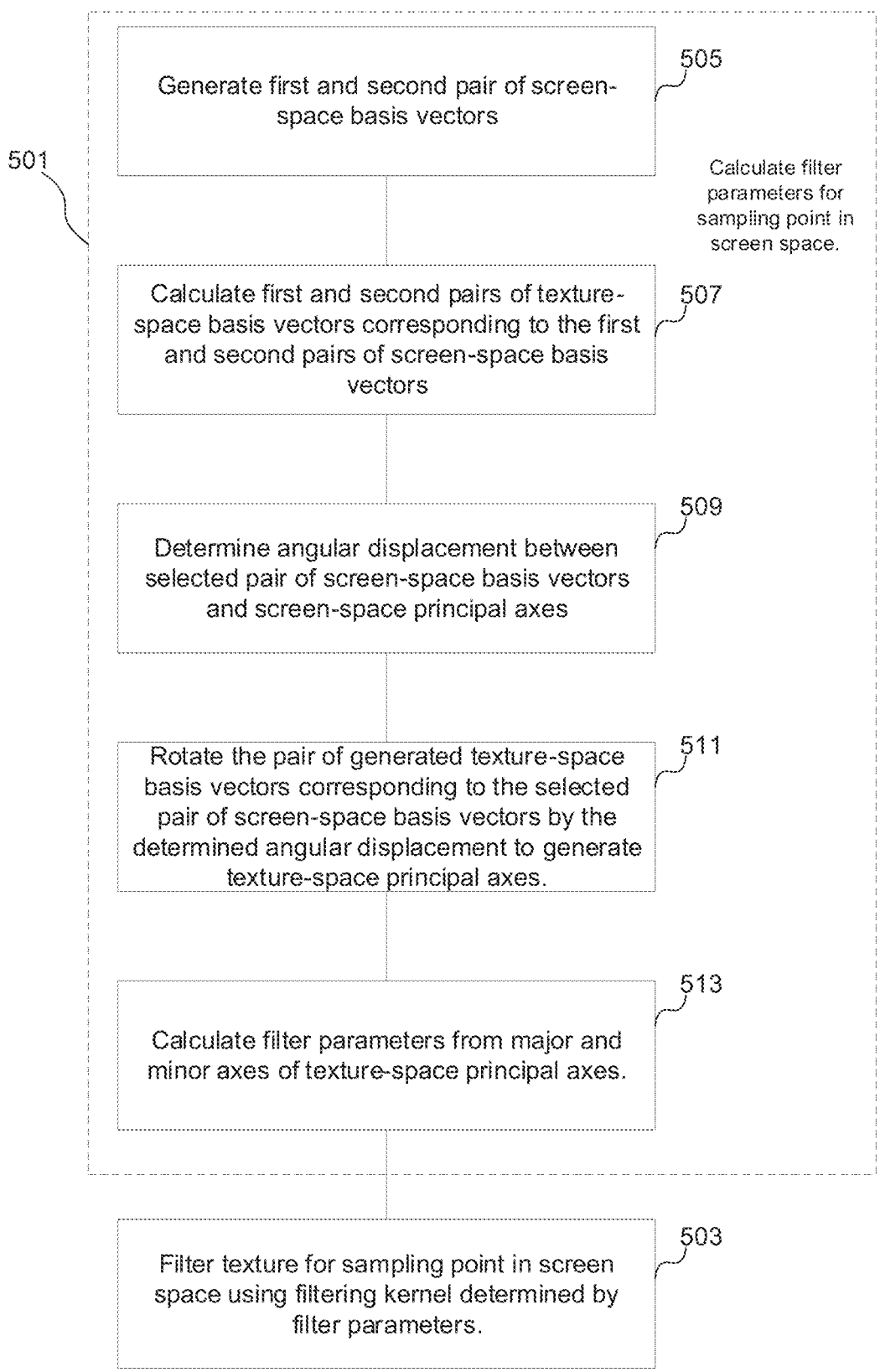
FIG. 5 is a flowchart of steps of a method for performing anisotropic texture filtering according to an embodiment of the invention.

A simple bypass condition that could be tested for is whether anisotropic filtering is disabled. Detection of this condition may also be performed by the bypass detection module 805. This bypass condition is not illustrated in FIG. 9 since it may be performed prior to generation of texture-space basis vectors. The operation of the texture filter 801 when testing for this isotropic bypass condition could be implemented as follows:

1) Determine at the module 805 whether anisotropic filtering has been disabled for the texture filtering operation.
2) If anisotropic texture filtering is not disabled, proceed to perform the steps of anisotropic texture filtering in accordance with the method outlined above with respect to FIG. 5.
3) If anisotropic texture filtering is disabled, retrieve pre-calculated texture-space vectors (of equal length and perpendicular to each other) and supply these vectors to the filter parameter unit 407 as the texture-space principal axes; and calculate isotropic filtering parameters at the filter parameter unit 407 and use these parameters to configure the texture filter unit 409 to perform isotropic texture filtering. Again, these pre-calculated texture-space basis vectors may correspond to screen-space basis vectors lying along the horizontal and vertical directions of screen space described above. The implementation may choose to use the first pair of texture-space basis vectors generated in step 507 of FIG. 5, and use the longer basis vector of the pair to define the mapping.

It is noted that if either the single basis or isotropic bypass conditions are satisfied (i.e. isotropic filtering is to be performed), the filter parameter unit 407 calculates the LOD parameter $\lambda$ to configure the texture filter in an analogous way (e.g. by performing the same set of calculations) to when the parameter $\lambda$ is computed to configure the texture filter for anisotropic filtering. The difference in the isotropic case is that the analogous set of calculations are not performed for the parameter $\mu$. Thus, the filter parameter unit 407 can operate in a similar manner for both isotropic and anisotropic filtering operations, with the difference between the two modes being that a second analogous set of calculations are performed in the anisotropic case compared to the isotropic case. Configuring the filter parameter unit 407 to perform one or two sets of analogous calculations in this manner enables an efficient architectural implementation. For example, if anisotropic filtering is disabled, resources used to calculate the parameter $\mu$ may be used to calculate the parameter $\lambda$ for a different set of inputs. This is described in more detail below with respect to FIG. 11.

A single basis bypass condition 903 may be tested once a first pair of texture-space basis vectors have been generated at the basis calculation unit 803. The single basis bypass condition is met when the anisotropy of the texture mapping for the sampling point P is low such that isotropic filtering may be performed without causing significant (e.g. perceptible) filtering artefacts. For example, a measure of anisotropy (or equivalently, isotropy) may be compared to some threshold, with the bypass condition being satisfied when the measure indicates that the anisotropy is below some pre-defined level (or equivalently, the isotropy is above some predefined level). A suitable threshold may be empirically determined as appropriate to the measure of anisotropy/isotropy with the bypass condition being met when the measure is above/below that threshold.

To detect an isotropic texture mapping, the basis calculation unit 803 may calculate a first pair of screen-space basis vectors $x_1$, $y_1$ using one of the finite differencing schemes described above, and then map these vectors to their texture space counterparts $X_1$, $Y_1$. The bypass detection module 805 may then determine: 1) whether the magnitude of the vectors $X_1$ and $Y_1$ are equal to each other, or equal to within a specified threshold; and 2) whether the vectors are perpendicular to each other, or perpendicular to within a specified threshold. If the module 805 determines that both conditions 1) and 2) are satisfied, this implies the texture mapping is isotropic and the module 805 determines that the bypass condition is satisfied. Note that this test enables one to avoid calculating the second set of basis vectors, but it requires that we can determine that the first pair of basis vectors are perpendicular in texture space. This is only justified when such a test is low in hardware cost compared to computing the second basis, with which subsequent bypass tests can be employed to avoid further calculation. One important example is when the texture is 2D, in which case, conditions 1) and 2) are satisfied when $$|X_u| \approx |Y_v|, |X_v| \approx |Y_u|, X_u \cdot Y_u \cdot X_v \cdot Y_v \leq 0 \qquad (33)$$

These conditions require simple comparisons of the vector components sign and magnitude and can be significantly cheaper to implement in hardware (e.g. in terms of silicon area, latency and power consumption) than generating a second set of basis vectors and associated lengths.

If the transformation is determined to be isotropic, no transformation of the texture-space basis vectors is needed to obtain the principal axes because the principal axes are in this case not uniquely defined and any pair of transformed vectors will have matching lengths in texture space. The direction of anisotropy is also undefined. Thus, there is no need for the basis calculation unit 803 to calculate the second pair of texture-space basis vectors $X_2$, $Y_2$. Instead, a pre-calculated pair of texture-space vectors may be supplied to the filter parameter unit 407 as the principal axes. Thus, if this bypass condition is satisfied, no second pair of texture-space basis vectors need be generated at step 507, and steps 509-511 from FIG. 5 can be omitted.

The operation of the texture filter 801 when testing for this first example single basis bypass condition could be implemented as follows:

1) Calculate at the basis calculation unit 803 a pair of screen-space basis vectors $x_1$, $y_1$ for sampling point P, e.g. using one of the finite differencing schemes described above.
2) Map the pair of screen-space basis vectors $x_1$, $y_1$ into texture space to determine the corresponding basis vectors $X_1$ and $Y_1$ in texture space.
3) Compare within the bypass detection module 805 the lengths of the vectors $X_1$ and $Y_1$ and their relative orientation in texture space to determine whether the vectors are of equal length (or equal to within a specified amount) and perpendicular to each other (or perpendicular to within a specified amount) to determine whether the bypass condition is satisfied.
4) If the bypass condition is not satisfied, proceed to perform the steps of anisotropic texture filtering in accordance with the method outlined above with respect to FIG. 5.
5) If the bypass condition is satisfied, retrieve pre-calculated texture-space vectors (of equal length and perpendicular to each other) and supply these vectors to the filter parameter unit 407 as the texture-space principal axes; and calculate isotropic filtering parameters at the filter parameter unit 407 and use these parameters to configure the texture filter unit 409 to perform isotropic texture filtering. These pre-calculated texture-space basis vectors may correspond to screen-space basis vectors lying along the horizontal and vertical directions of screen space described above.

An isotropic bypass condition may be tested 909 once the second pair of texture-space basis vectors have been generated at step 907. For example, the isotropy at a sampling point P may be considered to be high and the isotropic bypass condition satisfied when the following inequality is satisfied:

$$\frac{\max\{||X_1|^2 - |Y_1|^2|, ||X_2|^2 - |Y_2|^2|\}}{|\rho_{major}|^2 + |\rho_{minor}|^2} < \epsilon_{ISOTROPIC\ BYPASS\ THRESHOLD} \qquad (32)$$

Typically it is reasonable to make the approximation $$|\rho_{major}|^2 \approx |\rho_{minor}|^2 \approx \frac{|\rho_{major}|^2 + |\rho_{minor}|^2}{2}$$

where $\epsilon_{ISOTROPIC\ BYPASS\ THRESHOLD}$ is chosen so that $|\rho_{major}|^2$ and $|\rho_{minor}|^2$ satisfy some overall error tolerance (such as may be empirically determined or selected as appropriate to the level of accuracy used in the system). The identity $|\rho_{major}|^2 + |\rho_{minor}|^2 = |X_1|^2 + |Y_1|^2 = |X_2|^2 + |Y_2|^2$ allows us to perform the comparison in inequality (32) using just the basis vector square lengths.

A clamp bypass condition may be tested 909 once the second pair of texture-space basis vectors have been generated at 907. The clamp bypass condition may be that the principal axes transformation may be avoided if the following inequality is satisfied:

$$|\rho_{major}|^2 \leq 2^{2(lod_{min}-bias)} \qquad (34)$$

In this case, the result will be isotropic with $\lambda = \mu = lod_{min}$. This is because, from equations (24) through (31)

$$\lambda' = \lambda_{compute} + bias \leq \tfrac{1}{2} \log_2 |\rho_{major}|^2 + bias \leq lod_{min}$$

$$\mu' = \lambda_{compute} + bias = \tfrac{1}{2} \log_2 |\rho_{major}|^2 + bias \leq lod_{min}$$

By way of example, two convenient upper bounds exist.

Firstly, we may use the following anisotropic upper bound on the left hand side of equation (36):

$$|\rho_{major}|^2 \leq |\rho_{major}|^2 + |\rho_{minor}|^2 = |X_1|^2 + |Y_1|^2 = |X_2|^2 + |Y_2|^2 \qquad (35)$$

The larger the major axis is relative to the minor axis (i.e. the more anisotropic), the tighter this bound is. This result can be equivalently expressed as the property that the trace of a rotation matrix representing a transformation of the screen-space basis vectors into the principal axes is invariant under orthogonal transformations. Since $|X_1|^2 + |Y_1|^2 \leq 2^{2(lod_{min}-bias)}$ so implies that $|\rho_{major}|^2 \leq 2^{2(lod_{min}-bias)}$ this bypass condition becomes:

$$|X_2|^2 + |Y_2|^2 \leq 2^{2(lod_{min}-bias)} \qquad (36)$$

$$|X_1|^2 + |Y_1|^2 \leq 2^{2(lod_{min}-bias)}$$

If either of these inequalities is satisfied, steps 509 and 511 performed by the principal axes calculation unit 405 may be omitted.

Secondly, an isotropic upper bound exists when the magnitudes of the texture-space principal axes satisfies:

$$|\rho_{major}|^2 = \frac{|\rho_{major}|^2 + |\rho_{minor}|^2}{2} + \sqrt{\left(\frac{|X_1|^2 - |Y_1|^2}{2}\right)^2 + \left(\frac{|X_2|^2 - |Y_2|^2}{2}\right)^2} \leq \qquad (37)$$

$$\frac{1}{2}(|\rho_{major}|^2 + |\rho_{minor}|^2 + ||X_1|^2 - |Y_1|^2| + ||X_2|^2 - |Y_2|^2|) =$$

$$\max\{|X_1|^2, |Y_1|^2\} + \frac{1}{2}||X_2|^2 - |Y_2|^2| =$$

$$\max\{|X_2|^2, |Y_2|^2\} + \frac{1}{2}||X_1|^2 - |Y_1|^2|$$

This bound becomes tight if the square lengths approach each other (i.e. the mapping approaches being isotropic), or one of the basis vector pairs is a good approximation to the true principal axes. The bypass condition becomes $$\max\{|X_1|^2, |Y_1|^2\} + \tfrac{1}{2}||X_2|^2 - Y_2|^2| \leq 2^{2(lod_{min}-bias)}$$

$$\max\{|X_2|^2, |Y_2|^2\} + \tfrac{1}{2}||X_1|^2 - |Y_1|^2| \leq 2^{2(lod_{min}-bias)} \qquad (38)$$

If either of these inequalities is satisfied, steps 509 and 511 performed by the principal axes calculation unit 405 may be omitted.

The anisotropic and isotropic bounds may be combined into a single clamp bypass condition:

$$\max\{|X_1|^2, |Y_1|^2\} + \min\{\min\{|X_1|^2, |Y_1|^2\}, \tfrac{1}{2}||X_2|^2 - |Y_2|^2|\} \leq 2^{2(lod_{min}-bias)}$$

$$\max\{|X_2|^2, |Y_2|^2\} + \min\{\min\{|X_2|^2, |Y_2|^2\}, \tfrac{1}{2}||X_1|^2 - |Y_1|^2|\} \leq 2^{2(lod_{min}-bias)} \qquad (39)$$

If either of these inequalities is satisfied, steps 509 and 511 performed by the principal axes calculation unit 405 may be omitted. It may be advantageous for the bypass detection module 805 to be configured to evaluate inequality (39) instead of independently evaluating the individual inequalities (36) and (38). Furthermore, it may be advantageous to perform the calculation using the expression in the second line of the inequality (39) above in which ½|X₁|²−|Y₁|²| is calculated rather than ½|X₂|²−|Y₂|²| as per the expression at the first line of the inequality (39) above. This is because it is generally possible to calculate ½|X₁|²−|Y₁|²| earlier than ½|X₂|²−|Y₂|²|.

The operation of the texture filter 801 when testing for this clamp bypass condition could be implemented as follows:
1) Following steps 505 and 507 being performed at the basis calculation unit 803, the bypass detection module 805 determines whether the inequality (39) is satisfied.
2) If the inequality is satisfied, the texture-space vectors generated at step 507 are supplied to the filter parameter unit 407 as the texture-space principal axes and the filter parameter unit 407 calculates the isotropic filtering parameters; and
(3) The texture filter unit 409 proceeds to use the supplied principal axes and use isotropic filtering parameters to configure the texture filter unit 409 to perform isotropic texture filtering.

The bypass detection module could be configured to detect whether the basis vectors themselves serve as a good enough approximation for the true principal axes, so that while the texture mapping itself may or may not be anisotropic, the principal axes calculation is nevertheless redundant.

An anisotropic bypass condition may be tested 915 once the second pair of texture-space basis vectors have been generated at 907. The anisotropic bypass condition may be satisfied if the magnitude of the calculated angular displacement between a pair of screen-space basis vectors and the screen-space principal axes is less than a predetermined threshold. The predetermined threshold may be chosen so that it is less than the errors in the calculation of the angular displacement, which will vary depending on implementation and may be determined through suitable error analysis. When this anisotropic bypass condition is satisfied (i.e. the magnitude of the calculated angular displacement is less than the threshold), the transformed texture-space vectors corresponding to the screen-space vectors lying closest to the principal axes are used as the texture-space principal axes. The value $\rho_{min}$, e.g. calculated according to equation (21) can be used as the texture-space minor axis, and the value $\rho_{max}$, e.g. calculated according to equation (21) can be used as the texture-space major axis.

Since this anisotropic bypass condition depends on the value of the calculated angular displacement, the bypass detection module 805 may determine whether this condition is satisfied after step 509 has been completed. If this bypass condition is satisfied, it enables step 511 performed by the principal axes calculation unit 405 to be omitted.

For example, one of the two basis vector pairs at a sampling point P may be considered to be a good approximation to the true principal axes when the following inequality is satisfied:

$$\frac{\min\{||X_1|^2 - |Y_1|^2|, ||X_2|^2 - |Y_2|^2|\}}{\max\{||X_1|^2 - |Y_1|^2|, ||X_2|^2 - |Y_2|^2|\}} < \epsilon_{ANISOTROPIC\ BYPASS\ THRESHOLD} \qquad (40)$$

If $||X_1|^2 - |Y_1|^2| > ||X_2|^2 - |Y_2|^2|$ (i.e. the primary basis is selected), it is possible to make the approximations:

$$\rho_{major} \approx \begin{cases} X_1 & |X_1|^2 > |Y_1|^2 \\ Y_1 & |X_1|^2 < |Y_1|^2 \end{cases} \rho_{minor} \approx \begin{cases} Y_1 & |X_1|^2 > |Y_1|^2 \\ X_1 & |X_1|^2 < |Y_1|^2 \end{cases} \qquad (41)$$

And if $||X_1|^2 - |Y_1|^2| < ||X_2|^2 - |Y_2|^2|$ (i.e. the secondary basis is selected), it possible to make the approximations:

$$\rho_{major} \approx \begin{cases} X_2 & |X_2|^2 > |Y_2|^2 \\ Y_2 & |X_2|^2 < |Y_2|^2 \end{cases} \rho_{minor} \approx \begin{cases} Y_2 & |X_2|^2 > |Y_2|^2 \\ X_2 & |X_2|^2 < |Y_2|^2 \end{cases} \qquad (42)$$

The threshold $\epsilon_{ANISOTROPIC\ BYPASS\ THRESHOLD}$ may be chosen to satisfy an error tolerance that could be expressed in terms of the angular displacement error and/or the error in evaluating the rotation matrix. Suitable values may be empirically determined or selected as appropriate to the level of accuracy used in the system.

The operation of this texture filter 801 when testing for this anisotropic bypass condition could be implemented as follows:
1) Calculate in the basis calculation unit 803 the angular displacement between a pair of screen-space basis vectors and screen-space principal axes. This calculation can be performed in accordance with steps 505-509 described above.
2) Determine within the bypass detection module 805 whether the magnitude of the calculated angular displacement is less than a specified threshold to determine whether the bypass condition is satisfied.
3) If the bypass condition is not satisfied, proceed to calculate the texture-space principal axes and thereafter perform anisotropic texture filtering in accordance with steps 511, 513 and 503, described above.
4) If the bypass condition is satisfied, use the calculated texture-space vectors corresponding to the screen-space basis vectors lying closest to the principal axes as the principal axes, and supply these texture-space vectors to the filter parameter unit 407; calculate anisotropic filtering parameters at the filter parameter unit 407 using the supplied principal axes and then use these parameters to configure the texture filter unit 409 to perform anisotropic texture filtering in accordance with steps 513 and 503 described above.

Thus, anisotropic filtering is still performed at step 917 but the principal axes transformation may be skipped.

The bypass detection module 805 may be configured to test for one or more of the bypass conditions described above. An overview of an exemplary operation of the texture filter 801 testing for one or more of the bypass conditions is shown in FIG. 9, with reference to the exemplary flowchart shown in FIG. 5. The simple bypass condition (i.e. whether or not anisotropic filtering is enabled) is outside the scope of FIG. 9 and is described in more detail with respect to FIG. 11 below.

At step 901, the basis calculation unit 803 generates a first pair of texture-space basis vectors in accordance with step 507 of FIG. 5.

At step 903, the module 805 determines whether the single basis bypass condition is satisfied. If the module 805 determines that either condition is met, the method proceeds to step 905 and predetermined texture-space basis vectors are used as the principal axes and supplied to the filter parameter unit 407 to perform isotropic filtering. A second pair of texture-space basis vectors need not be generated at step 507 and step 509 of FIG. 5 need not be performed.

If the module 805 determines that the single basis bypass condition is not satisfied, the method proceeds to step 907 and a second pair of texture-space basis vectors is calculated at the basis calculation unit 803 in accordance with step 507 of FIG. 5.

At 909, the module 805 checks whether one or both of the isotropic and clamp bypass conditions are satisfied. If one or both are satisfied, the method proceeds to 911 and texture-space vectors generated at steps 901 and 907 are supplied to filter parameter unit 407 as the texture-space principal axes and isotropic filtering is performed.

Only a single vector may be required when switching to isotropic filtering at steps 909 and 911—e.g. only $\lambda_{compute}$ may be determined in accordance with the principles described herein.

If the isotropic and/or clamp bypass conditions are not satisfied, the method proceeds to step 915 and the anisotropic bypass condition may be performed. In order to determine a screen-space angular displacement for use in testing the anisotropic bypass condition, the principal axes calculation unit 405 may be configured to calculate the angular displacement between the screen-space basis vectors and the principal axes in the manner described herein (e.g with respect to 509 of FIG. 5). The bypass detection module 805 determines at step 915 whether the anisotropic bypass condition has been satisfied (e.g. whether the angular displacement calculated at 509 is less than a specified threshold). If this condition is satisfied, the method proceeds to step 917, where the texture-space vectors corresponding to the screen-space vectors lying closest to the principal axes are chosen as the texture-space principal axes and supplied to the filter parameter unit 407 to perform anisotropic filtering—e.g. according to step 513 of FIG. 5. Thus the transformation of principal axes according to 511 is bypassed.

If the anisotropic bypass condition is not satisfied, the method proceeds to step 919 and anisotropic filtering is performed in accordance with the principles herein. For example, at step 919 the principal axes calculation unit 405 may perform the rotation of the pair of texture-space basis vectors in accordance with step 511, the filter parameter unit 407 may calculate anisotropic filter parameters 513 and the texture filter unit 409 may perform anisotropic filtering 503.

The bypass detection module 805 may test any one or more of the bypass conditions in accordance with the method shown in FIG. 9. If a bypass condition is not tested by the bypass detection module 805 then that test and the accompanying bypass step (905, 911 or 917) may be omitted. Only one of the isotropic and clamp bypass conditions may be performed at step 909. If neither of the isotropic and clamp bypass conditions are performed by the bypass detection module 805, then test step 909 and bypass step 911 may be omitted.

The use of the bypass conditions described above with respect to FIGS. 8 and 9 enables the texture filter 801 to categorise a texture mapping as isotropic or anisotropic, and to skip steps in the performance of anisotropic texture filtering. This is convenient because anisotropic texture filtering is typically more computationally expensive than isotropic texture filtering. For example, disabling the principal axes calculation in an anisotropic filter and performing isotropic filtering typically enables twice the throughput compared to anisotropic filtering. Furthermore, due to the hardware architecture shown in FIG. 8, in which the principal axes calculation unit 405 can be bypassed by the basis calculation unit 803, isotropic filtering calculations can be performed by the filter 801 in parallel with anisotropic filtering calculations. This is convenient because anisotropic filtering calculations typically have reduced throughput requirements compared to isotropic filtering calculations. Thus, the instances in which the principal axes calculation unit 405 is used can be reduced compared to the basis calculation unit 803 whilst still maintaining a target throughput of texture filter results.

Figure 11:
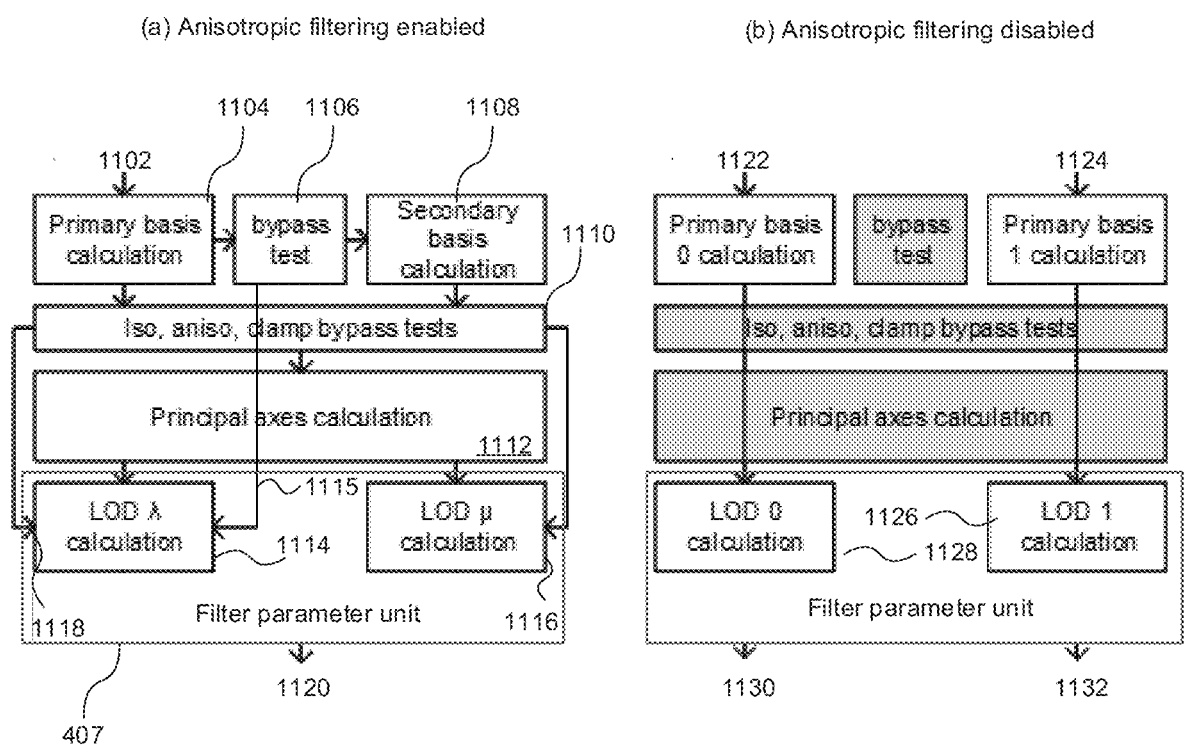
FIG. 11 compares the performance of anisotropic and isotropic filtering.

FIG. 11 illustrates the performance of (a) anisotropic filtering with testing for the bypass conditions described above, and (b) anisotropic filtering disabled (e.g. the simple bypass test described above is satisfied) and so isotropic filtering is performed. The figure illustrates that the same texture filter 801 (functionally depicted in FIG. 11) may be configured to perform two isotropic filter operations in parallel instead of a single anisotropic filter operation. FIG. 11 will now be described with respect to FIGS. 8 and 5.

In FIG. 11(*a*), the texture filter 801 receives a single set of image data 1102 for anisotropic filtering. A primary basis calculation 1104 is performed to calculate a first pair of texture-space basis vectors (e.g. the first half of operation 507). The single basis bypass condition is then tested 1106. If satisfied, processing steps 1108 and 1112 may be skipped via 1115 and isotropic filtering may be performed with predetermined basis vectors being provided to the filter parameter unit 407. The texture filter unit 409 is not shown in FIG. 11.

If the single basis bypass condition is not satisfied, secondary basis calculation 1108 is performed to calculate a second pair of texture-space basis vectors (e.g. the second half of operation 507. One or more of the isotropic, clamp and anisotropic bypass tests 1110 may then be performed using the primary and secondary basis vectors. If one or more of the bypass tests are satisfied, the principal axes calculation 1112 may be skipped 1118, and the LOD parameters formed at 1114 and 1116 in accordance with the bypass tests described above. If none of the bypass tests are satisfied, the principal axes calculation 1112, and the filter parameter unit comprising the LOD calculations 1114 and 1116 prepare for anisotropic filtering in accordance with steps 509 to 513. In the cases described in FIG. 11(*a*), the texture filter 801 operates on the single set of image data 1102 to produce a single set of output data 1120 for use in anisotropic filtering.

In FIG. 11(*b*), anisotropic filtering is disabled and the bypass tests 1106 and 1110, and the principal axes calculation 1112 is not performed. The texture filter 801 is therefore configured to performed isotropic filtering. In some examples the principal axis calculation unit 405 could be disabled and/or in a sleep state to save power. In FIG. 11(*b*), the texture filter 801 may operate in parallel on two input image data sets 1122 and 1124, using ability of the basis calculation unit to calculate first and second basis vectors in order to generate a primary basis vector for each of the two data sets. Similarly, the filter parameter unit 407 can perform an LOD calculation 1126 and 1128 for each of the data sets so as to generate in parallel output data sets 1130 and 1132 in respect of each of the input data sets.

The same texture filter 801 can therefore be configured to operate on two data sets in parallel when performing isotropic filtering, or one data set when performing anisotropic filtering.

The approach to performing anisotropic filtering described herein is composed of two sets of analogous calculations, where each set of calculations closely resembles the set of calculations performed for an isotropic filtering operation. For isotropic filtering operations, approaches typically involve calculating basis vectors, calculating their square lengths and ordering them to determine major and minor axes and then performing a set of filter parameter calculations to calculate the LOD parameter $\lambda$. In the approaches to performing anisotropic filtering operations described herein, a similar set of calculations are performed on a second pair of basis vectors with the addition of extra calculations to rotate one of the basis pairs onto the principal axes (if this is required), and a set of analogous filter parameter calculations performed to calculate the anisotropic LOD parameter $\mu$. Performing the anisotropic filtering in this way enables an efficient architectural implementation of a filtering unit that can perform isotropic or anisotropic filtering operations.

A further convenient aspect to the anisotropic filtering approaches described herein is that it has been found from error analysis that the accuracy requirement of the square-length calculations used in the screen-space approximation described above (and potentially in cases where the mapping is isotropic or anisotropic filtering is disabled) is similar to the sufficient accuracy needed to determine the angular displacement (at step 509) to generate an accurate principal axes construction. This is because the angular displacement error (involved in the rotation of the selected basis at step 511) makes a quadratic contribution to the final error. In other words, the angular displacement can be determined relatively inaccurately and still be used to generate the principal axes to high accuracy (provided the rotation itself is performed accurately). This is convenient because it means the square lengths of the basis vectors in the anisotropic cases can continue to be calculated with the same accuracy levels as in the isotropic case, which conveniently avoids the requirement to increase the accuracy of the square-length calculations for the anisotropic calculations which would then be unnecessary for cases when isotropic filtering is performed.

In the examples described above, MIP-mapping was implemented as part of the texture filtering operations. It will be appreciated that this was just for the purposes of illustration and that, in other examples, MIP-mapping might not be implemented. If MIP-mapping is not implemented, then an analogous set of principal axis calculations are performed to calculate the texture-space major and minor axes, but the filter parameter unit 407 uses these axes to configure a filter that performs texture filtering at only a single LOD. The filter itself could be configured using the major and minor axes in an analogous way to that described above such that its footprint in texture space is determined by the principal axes, but filtering is only performed at one image level of the texture.

The type of filter used to perform the texture filtering might be implementation dependent. In the examples described above, a Gaussian filter was referenced but it will be appreciated that other types of filter can be configured using the principal axes of the texture mapping.

The filter units of FIGS. 4 and 8 are shown as comprising a number of functional blocks. This is schematic only and is not intended to define a strict division between different logic elements of such entities. Each functional block may be provided in any suitable manner. It is to be understood that intermediate values described herein as being formed by a unit or module need not be physically generated by the unit or module at any point and may merely represent logical values which conveniently describe the processing performed by the unit and module between its input and output.

The units described herein may be embodied in hardware on an integrated circuit. The units described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a texture filter unit configured to perform any of the methods described herein, or to manufacture a texture filter unit comprising any apparatus described herein. An integrated circuit definition dataset may be, for example, an integrated circuit description.

There may be provided a method of manufacturing, at an integrated circuit manufacturing system, a texture filter unit as described herein. There may be provided an integrated circuit definition dataset that, when processed in an integrated circuit manufacturing system, causes the method of manufacturing a texture filter unit to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS (RTM) and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a texture filter unit will now be described with respect to FIG. 10.

Figure 10:
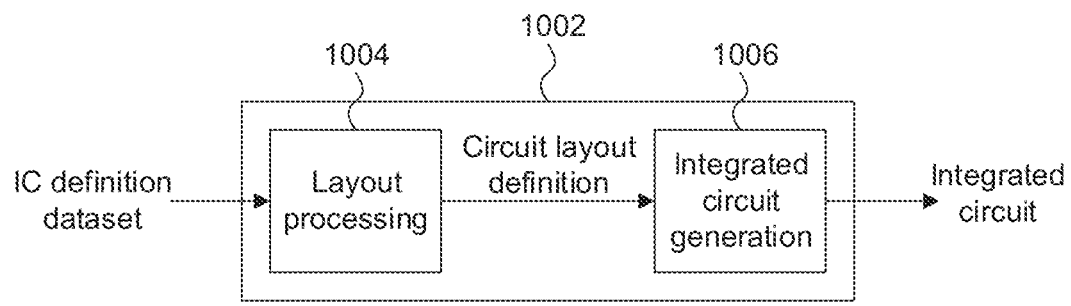
FIG. 10 is an example of an integrated circuit manufacturing system.

FIG. 10 shows an example of an integrated circuit (IC) manufacturing system 1002 which is configured to manufacture a texture filter unit as described in any of the examples herein. In particular, the IC manufacturing system 1002 comprises a layout processing system 1004 and an integrated circuit generation system 1006. The IC manufacturing system 1002 is configured to receive an IC definition dataset (e.g. defining a texture filter unit as described in any of the examples herein), process the IC definition dataset, and generate an IC according to the IC definition dataset (e.g. which embodies a texture filter unit as described in any of the examples herein). The processing of the IC definition dataset configures the IC manufacturing system 1002 to manufacture an integrated circuit embodying a texture filter unit as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a texture filter unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 10, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of performing texture filtering, comprising:
    calculating first and second pairs of texture-space basis vectors that correspond to first and second pairs of screen-space basis vectors transformed to texture space under a local approximation of a mapping between screen space and texture space;
    based on differences in magnitudes of the vectors of at least one of the pairs of texture-space basis vectors, determining an angular displacement between a selected pair of the first and second pairs of screen-space basis vectors and screen-space principal axes of the local approximation of the mapping that indicate maximum and minimum scale factors of the mapping;
    using the determined angular displacement and the selected pair of screen-space basis vectors to generate texture-space principal axes, the texture-space principal axes comprising a major axis associated with the maximum scale factor of the mapping and a minor axis associated with the minimum scale factor of the mapping;
    filtering a texture using the major and minor axes.

2. The method of claim 1, wherein the step of using the determined angular displacement and the selected pair of screen-space basis vectors to generate the texture-space principal axes comprises rotating the selected pair of screen-space basis vectors by the determined angular displacement to generate screen-space principal axes, and transforming the screen-space principal axes to texture space to generate the texture-space principal axes.

3. The method of claim 1, wherein the second pair of screen-space basis vectors are rotated 45 degrees relative to the first pair of screen-space basis vectors.

4. The method of claim 1, wherein the pair of screen-space basis vectors having the smaller angular displacement to the screen-space principal axes are chosen as the selected pair of screen-space basis vectors.

5. The method of claim 1, wherein the pair of screen-space basis vectors corresponding to the pair of texture-space basis vectors having the greatest difference in length between vectors of that texture-space pair are chosen as the selected pair of screen-space basis vectors.

6. The method of claim 1, wherein said determining an angular displacement comprises:
    comparing the differences in magnitude of the texture-space basis vectors to determine the angular displacement between each pair of screen-space basis vectors and the screen-space principal axes; and
    choosing as the selected pair the screen-space basis vectors having the smaller angular displacement to the screen-space principal axes.

7. The method of claim 1, wherein said determining an angular displacement comprises:
    for each pair of texture-space basis vectors, calculating the difference in magnitude between the vectors of the texture-space basis vector pair;
    choosing as the selected pair the screen-space basis vectors corresponding to the pair of texture-space basis vectors having the greatest difference in magnitude between the vectors of the texture-space basis vector pair; and determining the angular displacement only between the selected pair of screen-space basis vectors and the screen-space principal axes.

8. The method of claim 1, wherein said determining an angular displacement comprises:

identifying the texture-space basis vector pair for which either basis vector in the texture-space basis pair is either greater in length or shorter in length than both basis vectors of the other texture-space basis vector pair; and choosing as the selected pair the screen-space basis vectors corresponding to the identified texture-space basis vector pair.

9. The method of claim 7, wherein the angular displacement is determined according to the equation $$\tan(2\theta) = \frac{X_2 \cdot X_2 - Y_2 \cdot Y_2}{X_1 \cdot X_1 - Y_1 \cdot Y_1}$$

when the first pair of screen-space basis vectors $x_1$, $y_1$ is the selected pair of screen-space basis vectors, and according to the equation $$\tan(2\theta) = \frac{Y_1 \cdot Y_1 - X_1 \cdot X_1}{X_2 \cdot X_2 - Y_2 \cdot Y_2}$$

when the second pair of screen-space basis vectors $x_2$, $y_2$ is the selected pair of screen-space basis vectors, where $\theta$ is the angular displacement between the selected pair of screen-space basis vectors and the screen-space principal axes, $X_1$ and $Y_1$ are the corresponding pair of texture-space basis vector for screen-space basis vector x, and $y_1$, and $X_2$ and $Y_2$ are the corresponding pair of texture-space basis vector for screen-space basis vector $x_2$ and $y_2$.

10. The method of claim 1, when applying a texture at a sampling point, wherein the first pair of texture-space basis vectors are generated from finite differencing of texture coordinates for a 2×2 block of sampling points, each basis vector of the first pair of texture-space basis vectors being calculated from the difference in texture coordinates for diagonal sampling points of the 2×2 block, wherein the second pair of screen-space basis vectors are generated from finite differencing of the first pair of texture-space basis vectors along the horizontal and vertical directions of the 2×2 block of sampling points.

11. The method of claim 1, wherein the step of using the determined angular displacement and the selected pair of screen-space basis vectors to generate the texture-space principal axes comprises:

determining the direction of rotation to rotate the selected pair of screen-space basis vectors onto the screen-space principal axes;

calculating:

$$\rho_{minor} = \begin{cases} \cos\theta\rho_{min} + \sin\theta\rho_{max} & \text{if clockwise rotation} \\ \cos\theta\rho_{min} - \sin\theta\rho_{max} & \text{if anticlockwise rotation} \end{cases}$$

$$\rho_{major} = \begin{cases} \cos\theta\rho_{max} - \sin\theta\rho_{min} & \text{if clockwise rotation} \\ \cos\theta\rho_{max} + \sin\theta\rho_{min} & \text{if anticlockwise rotation} \end{cases}$$

where $\rho_{minor}$ is the texture-space minor axis, $\rho_{major}$ is the texture-space major axis, $\theta$ is the angular displacement between the selected screen-space basis vectors and screen-space principal axes, $\rho_{min}, \rho_{max} \in X_1, Y_1$ if the selected basis is $x_1$, $y_1$ where $\rho_{min}=X_1$, $\rho_{max}=Y_1$ if $|X_1|^2 < |Y_1|^2$ and $\rho_{min}=Y_1$; $\rho_{max}=X_1$ if $|X_1|^2 \geq |Y_1|^2$; and $\rho_{min}, \rho_{max} \in X_2, Y_2$ if the selected basis is $x_2$, $y_2$ where $\rho_{min}=X_2$, $\rho_{max}=Y_2$ if $|X_2|^2 < |Y_2|^2$ and $\rho_{min}=Y_2$, $\rho_{max}=X_2$ if $|X_2|^2 > |Y_2|^2$.

12. The method of claim 1, wherein filtering the texture using the major and minor axes comprises calculating texture-filter parameters, wherein the step of calculating the texture-filter parameters comprises:

calculating a level of detail (LOD) parameter $\lambda$ indicating MIP-map levels of the texture to filter; and calculating an anisotropic LOD parameter u indicating a footprint of the filter kernel in the MIP-map levels indicated by the LOD parameter 2.

13. The method of claim 12, wherein the LOD parameter $\lambda$ is calculated using the major axis and the minor axis;

wherein the anisotropic LOD parameter u is calculated using the major axis;

wherein the step of calculating the LOD parameter $\lambda$ comprises applying a clamping to an intermediate LOD parameter, and the step of calculating the anisotropic LOD parameter u comprises applying the same clamping to an intermediate anisotropic LOD parameter; and wherein the LOD parameter $\lambda$ and anisotropic LOD parameter u are calculated by performing the same set of calculations on their respective intermediate parameters, the intermediate parameter for the parameter $\lambda$ being calculated using the major axis and the minor axis and the intermediate parameter for the anisotropic parameter u being calculated using the major axis.

14. A method of performing texture filtering incorporating the method as set forth in claim 1, comprising:

determining whether at least one of a set of bypass conditions indicating isotropic filtering is to be performed is satisfied; and only if none of the set of one or more bypass conditions are satisfied, performing texture filtering as set forth in claim 1;

wherein the method further comprises performing a method of isotropic texture filtering if at least one of the set of bypass conditions are satisfied.

15. The method of claim 14, wherein the method of isotropic texture filtering comprises:

selecting texture-space basis vectors corresponding to a pair of screen-space basis vectors and setting the selected texture-space vectors as the principal axes;

calculating texture filter parameters from the principal axes; and filtering a texture using a filtering kernel configured using the texture filter parameters.

16. The method of claim 15, wherein the step of calculating the texture-filter parameters as part of the isotropic texture filtering comprises:

calculating a level of detail (LOD) parameter $\lambda$ indicating MIP-map levels of the texture to filter, wherein the LOD parameter $\lambda$ is calculated using the major axis and the minor axis, and the step of calculating the LOD parameter $\lambda$ comprises applying a clamping to an intermediate LOD parameter.

17. An apparatus configured to perform texture filtering, comprising:

a basis-calculation unit configured to:

calculate first and second pairs of texture-space basis vectors that correspond to first and second pairs of screen-space basis vectors transformed to texture space under a local approximation of a mapping between screen space and texture space, and determine, based on differences in magnitudes of the vectors of at least one of the pairs of texture-space basis vectors, an angular displacement between a selected pair of the first and second pairs of screen-space basis vectors and screen-space principal axes of the local approximation of the mapping that indicate maximum and minimum scale factors of the mapping;

a principal-axes calculation unit configured to:

use the determined angular displacement and the selected pair of screen-space basis vectors to generate texture-space principal axes, the texture-space principal axes comprising a major axis associated with the maximum scale factor of the mapping and a minor axis associated with the minimum scale factor of the mapping;

a texture filter unit configured to perform texture filtering using the major and minor axes.

18. An apparatus configured to perform texture filtering, comprising:

a basis-calculation unit;

a principal-axes calculation unit; and a texture filter unit;

wherein the basis-calculation unit comprises a bypass detection module configured to determine whether at least one of a set of one or more bypass conditions are satisfied; the apparatus being configured to, if none of the set of bypass conditions are satisfied, perform a method of filtering comprising:

at the basis calculation unit:

calculating first and second pairs of texture-space basis vectors that correspond to first and second pairs of screen-space basis vectors transformed to texture space under a local approximation of a mapping between screen space and texture space, the first and second pairs of screen-space basis vectors being rotated relative to each other, and determining, based on differences in magnitudes of the vectors of at least one of the pairs of texture-space basis vectors, an angular displacement between a selected pair of the first and second pairs of screen-space basis vectors and screen-space principal axes of the local approximation of the mapping that indicate maximum and minimum scale factors of the mapping;

at the principal-axes calculation unit:

using the determined angular displacement and the selected pair of screen-space basis vectors to generate texture-space principal axes, the texture-space principal axes comprising a major axis associated with the maximum scale factor of the mapping and a minor axis associated with the minimum scale factor of the mapping; and at the texture filter unit:

performing texture filtering using the major and minor axes;

the apparatus being further configured to, if at least one of the set of bypass conditions are satisfied, perform a method of filtering comprising:

at the basis calculation unit:

selecting texture-space basis vectors corresponding to a pair of screen-space basis vectors and setting the selected texture-space vectors as the principal axes; and at the texture filter unit:

filtering the texture using the principal axes.

19. The apparatus of claim 18, wherein the set of one or more bypass conditions comprises one or more of: (i) anisotropic filtering being disabled; (ii) the degree of anisotropy of the mapping between screen space and texture space being less than a specified first threshold; (iii) the degree of isotropy of the mapping between screen space and texture space being above a specified second threshold; (iv) the squared length of the major texture space principal axis relative to the sum of the squared lengths of the major and minor texture space principal axes lies between specified upper and lower bounds; (v) the magnitude of the determined angular displacement is less than a specified third threshold; (vi) the difference between the magnitudes of the minor and major texture space axes being less than a specified fourth threshold, wherein the bypass detection module is configured to determine the degree of anisotropy from a comparison of the lengths of the vectors forming a pair of screen-space basis vectors.

20. The apparatus of claim 19, further comprising a filter parameter unit configured to, if none of the set of bypass conditions are satisfied:

calculate (i) a level of detail (LOD) parameter indicating MIP-map levels of the texture to filter and (ii) an anisotropic LOD parameter u indicating a footprint of the filter kernel in the MIP-map levels indicated by the LOD parameter $\lambda$ by performing the same set of calculations on their respective intermediate parameters;

the filter parameter unit being further configured to, if at least one of the set of bypass conditions are satisfied:

calculate a level of detail (LOD) parameter $\lambda$ indicating MIP-map levels of the texture to filter by performing the same set of calculations on an intermediate parameter.

* * * * *